US009068571B2

(12) United States Patent
Hilaris et al.

(10) Patent No.: US 9,068,571 B2
(45) Date of Patent: Jun. 30, 2015

(54) SEAL FOR OIL-FREE ROTARY DISPLACEMENT COMPRESSOR

(75) Inventors: John A. Hilaris, Elmhurst, IL (US); Nicholas P. Liarakos, Bartlett, IL (US)

(73) Assignee: ErgoSeal, Inc., Carol Stream, IL (US)

( * ) Notice: Subject to any disclaimer, the term of this patent is extended or adjusted under 35 U.S.C. 154(b) by 379 days.

(21) Appl. No.: 13/360,449

(22) Filed: Jan. 27, 2012

(65) Prior Publication Data

US 2013/0075975 A1    Mar. 28, 2013

Related U.S. Application Data

(63) Continuation-in-part of application No. 12/418,005, filed on Apr. 3, 2009, now abandoned.

(51) Int. Cl.

| F16J 15/16 | (2006.01) |
|---|---|
| F04C 27/00 | (2006.01) |
| F01D 11/02 | (2006.01) |
| F16J 15/44 | (2006.01) |
| F16J 15/00 | (2006.01) |
| F04C 15/00 | (2006.01) |
| F16J 15/40 | (2006.01) |

(52) U.S. Cl.
CPC ........... *F04C 15/0003* (2013.01); *F04C 27/009* (2013.01); *F16J 15/002* (2013.01); *F16J 15/441* (2013.01); *F01D 11/025* (2013.01); *F16J 15/004* (2013.01); *F16J 15/164* (2013.01); *F16J 15/406* (2013.01)

(58) Field of Classification Search
CPC ......... F16J 15/002; F16J 15/004; F16J 15/44; F16J 15/164; F16J 15/3292; F16J 15/441; F16J 15/445; F16J 15/447; F16J 15/4472; F01D 11/00; F01D 11/02; F01D 11/025; F04C 27/009

USPC .................... 277/408, 411, 412, 413, 422
See application file for complete search history.

(56) References Cited

U.S. PATENT DOCUMENTS

| 3,991,588 A * | 11/1976 | Laskaris ...................... 62/50.7 |
|---|---|---|
| 4,487,563 A * | 12/1984 | Mori et al. ................. 418/201.1 |
| 5,014,999 A * | 5/1991 | Makhobey .................... 277/422 |
| 5,322,298 A * | 6/1994 | Maier .......................... 277/430 |
| 6,368,077 B1 * | 4/2002 | Meyerkord et al. ........... 417/407 |
| 2004/0056423 A1* | 3/2004 | Staljanssens ................ 277/305 |
| 2008/0240964 A1* | 10/2008 | Kimura et al. ............... 418/104 |

* cited by examiner

*Primary Examiner* — Kristina Fulton
*Assistant Examiner* — Nicholas L Foster
(74) *Attorney, Agent, or Firm* — Vangelis Economou; Economou IP Law

(57) ABSTRACT

Non-contacting cartridge shaft seals prevent leakage loss of process gases in an "oil free" rotary screw compressor or blower, while simultaneously preventing ingress of lubricating oil to the pumping chamber, allowing the compressor/blower to generate process pressure differentials without oil contamination. A compact unitized seal cartridge assembly is provided in the end plates of the pump housing. One of the rotor shafts extends through an aperture in the end plate or housing, between the pumping chamber and oil-lubricated gear/bearing cases. Internal elements have the ability to self-align radially achieving essential concentricity with shaft rotational axes. The rotor shafts or sleeves non-contact relationship during operation allow increased ranges of shaft rotational speeds. Air seal elements restrict flow of process air from the pumping or compression chamber, and oil seal elements with a directional spiral groove on the inside diameter prevent the leakage of lubricating oil to the process or atmosphere.

13 Claims, 10 Drawing Sheets

SEAL FOR OIL-FREE ROTARY DISPLACEMENT COMPRESSOR

CROSS-REFERENCE TO RELATED APPLICATIONS

This is a continuation-in-part of prior application Ser. No. 12/418,005, filed Apr. 3, 2009, and now abandoned.

BACKGROUND OF THE INVENTION

1. Field of the Invention

This invention relates generally to dry rotary displacement compressors and blowers and in particular to screw compressors using oil for lubrication, cooling and sealing to produce oil-free compressed gases, and wherein the compression space produces oil-free compressed gases.

2. Background Art

Rotary displacement compressors include sets of rotary gear wheels that must be maintained lubricated and cool in order to provide the compressive power while maintaining their integrity. In some prior art devices, for example those described in U.S. Pat. No. 3,976,165 to Pilarczyk, high pressure oil was used to lubricate carbon seal rings in a contacting labyrinth gas seal. Beyond the complexity and expense of such a device, the oil seal was a "wet seal" in which the gas being compressed, referred to as the process gas, came into contact with the lubricating oil and some became entrained in the process gas resulting in an undesirable condition.

Oil enters the compression space through gaps that form between the shafts connected to the rotors and the wall of the casing or housing enclosing the shafts. In a space where the gas is being compressed by rotors, it is important that no oil is present. For dry type (oil-free type) seals that provide a seal between the compressor elements and the remainder of the pump, the elements are provided in a housing, separated from the compressor elements. Nevertheless, the risk of oil used for lubricating the journaling rotor bearings entering the compression space remains, and after entering the compressor portion, the high rotational speed of the rotors causes any lubricating oil to mist up and to become entrained in the gas being compressed. This is highly undesirable when clean "dry" compressed gas is needed.

The lubricating oil, although critical in maintaining the shaft journaling rotor bearings lubricated, must be sealed in the bearing chamber or otherwise maintained away from the compression space where the impeller rotors are rotating to compress the process gas. Thus, it has hitherto been necessary to provide a seal that prevents the oil from migrating from the bearings toward the compression elements in the housing and toward the environment.

The usual practice to accomplish this sealing function is to provide an oil shield between the shafts and the compression space. Such oil shields are described, for example, in U.S. Pat. No. 4,487,563 to Mori et al., and in several Japanese patent published applications cited within that U.S. Pat. No. 4,487,563 discloses an oil-free rotary displacement compressor including a main casing defining a compression space, a pair of rotors housed in the compression space and each having a screw thread portion and shaft portions, radial bearings and thrust bearings for causing the rotors outer diameter vanes to mesh, shaft sealing means for sealing the shaft portions to avoid gas leaks from the compression space to outside and entry of oil into the compression space from the bearings. Floating type screw seal rings are each formed on the inner surface with a spiral screw thread and a root of thread. These are fitted over one of the suction-side shaft portions and supported by the casing in such a manner as to be movable in both the radial and the axial directions with respect to the casing. Stationary type screw seal rings, each formed with a spiral screw thread and a root of thread are each fitted over one of the discharge-side shaft portions and supported by the casing in such a manner as to be movable only in the axial direction with respect to the casing. For purposes of description, the teaching of the shaft and rotor configuration found in U.S. Pat. No. 4,487,563 is incorporated herein by reference.

Other prior art attempts directed toward providing for oil shield integrity and effectiveness have not been completely successful in that the design of the oil shield and sealing methods are cumbersome and complicated and do not always effectively repel oil form reaching the compression space or chamber. For example, the sealing capability of the rotary screw seals used in most dry rotary screw compressors and blowers rely primarily on the positive displacement pressure of the air in the compression chamber to drive back the oil that lubricates the bearings just outside of the rotary screw seal sets. However, because of the need to have the pressure at a high level in order to provide a sufficient barrier to oil leakage, too much of the compressed gas is evacuated from the compression chamber and permitted to leak outwardly back toward the bearings. As the bearings are usually in fluid communication with the environment, the operational efficiency of the compressor is decreased, and a problem with an oil seal in the bearings can also cause oil to leak out of the bearing chamber under the high pressure process gas.

Additionally, the location of the oil shield and the construction of the oil shield means are not particularly suitable for providing ideal conditions for providing sufficient sealing capacity of the screw type seals to repel oil leakage past the seal. The invention applies primarily to positive displacement dry rotary screw compressors and blowers where oil is not introduced to the compression chamber for sealing, cooling, or lubrication. The efficiency and performance of such equipment is greatly dependent on effective sealing of the pumping chamber against process gas leakage and the ingress of lubricating oils used on the gears and bearings.

Sealing methods used to accomplish the above traditionally include lip seals, mechanical face seals, and non contact labyrinth seals. It is often desirable to increase the rotation speed of these compressors and blowers to achieve increased pumping efficiency. These performance requirements often exceed the maximum speed capabilities of lip seals, mechanical seals, and any type of seal which requires contact between stationary and rotating elements to establish sealing. This leaves only non-contacting labyrinth seals as an alternative. Most traditional labyrinth seals have performance limitations in speed, pressure sealing capability, and service temperature which are addressed in the present invention.

U.S. Pat. No. 7,338,255, among others, proposes a method of restraining oil flowing into the compression chamber by providing a series of stepped ledges and very narrow rotation clearance between the rotor and the stator of an impeller to provide for sealing. This seal relies on the principles of a labyrinth type seal, with convoluted fluid paths, and a very small tolerance between relatively moving surfaces, together with spaces that are enlarged and constricted so that the fluid flow is constricted and pressurized along the leakage path, thereby creating sealing properties in the configuration. This type of sealing is not conducive to efficiencies at the high rotational speeds of compressors because the tolerances must be very close and must be always maintained during the periods of rotation. Additionally, because of the ledges and other three dimensional features, these seals require an excessive amount of space in the sealing chamber, which is usually restricted by the compressor configuration. Because the rotation and relative motion of moving parts create frictional heating, even when the parts are not contacting each other, the rates of expansion of the parts may be different and cause one part to expand to the point of coming into contact with other relatively moving parts.

What is considered desirable is a combination high pressure gas and oil seal having a configuration and operation that are capable of producing a pure or almost pure process fluid, that provides for appropriate oil lubrication to the journal bearings, and while simultaneously not permitting an excessive amount of compressed gas out of the non-contacting rotary seals. Additional features that are desirable are the capability to withstand the increased temperatures created in higher rotation compressors and the like, by providing close tolerances in the seal elements, a simple, unified and axially compact design that is easily installed, that can provide excellent shaft sealing in a durable, robust configuration that is not limited by the rotational speeds of a compressor. Ideally, the sealing system does not require external control or monitoring or any support from external to the shaft seal cavity. Additional features will be described below and will become apparent to a person having ordinary skill in the art as an appreciation of the present invention is obtained.

SUMMARY OF THE INVENTION

Accordingly, what is described herein and claimed below is a shaft seal cartridge for use in rotary displacement compressor, the compressor having a compressor chamber between two shaft bearings, comprising a cartridge carrier deposed in a seal cavity and annularly around a shaft capable of housing at least two self aligning seal rings, the cartridge carrier including a fluid communication path in fluid communication with the environment outside the seal cavity, a first oil seal ring disposed within a cartridge cavity at least partially defined by an inner diameter of said cartridge carrier and sealing between a fluid communication path side and a shaft bearing side, the first oil seal ring being statically sealed against a surface of said cartridge carrier, the first oil seal ring further comprising a spiral groove in an inner diameter surface thereof, and the spiral grooves being shaped, dimensioned and oriented to provide a dynamic seal between relatively rotating parts by pumping a gas from the fluid communication path side towards the oil bearing side, thereby inhibiting leakage of oil from the bearings along the shaft, a second compressed air seal ring for inhibiting leakage of compressed air disposed within the cartridge cavity and sealing between the fluid communication path side and a compressor side, the second compressed air seal ring being statically sealed against a surface of said cartridge carrier, and providing a dynamic seal between the seal cartridge and the relatively rotating shaft, wherein both the first oil seal ring and the second compressed air seal ring are self aligning relative to the seal cartridge throughout a limited range of radial motion while simultaneously maintaining the respective static and dynamic seals.

The present invention as is described herein is a cartridge-type seal that is rigidly mounted within a cavity or bore machined into the pump end plate or housing. Preferably, only one rotor shaft passes through a single aperture in the end plate. The seal assembly may be mounted within the bore by means of an interference fit, or with a snap ring retainer. O-rings are provided to establish a secondary seal between the seal cartridges and housing to isolate the compression chamber from the remainder of the housing configuration.

BRIEF DESCRIPTION OF THE DRAWING FIGURES

The present invention will now be discussed in further detail below with reference to the accompanying figures in which.

DETAILED DESCRIPTION OF THE PREFERRED EMBODIMENTS

Figure 1:
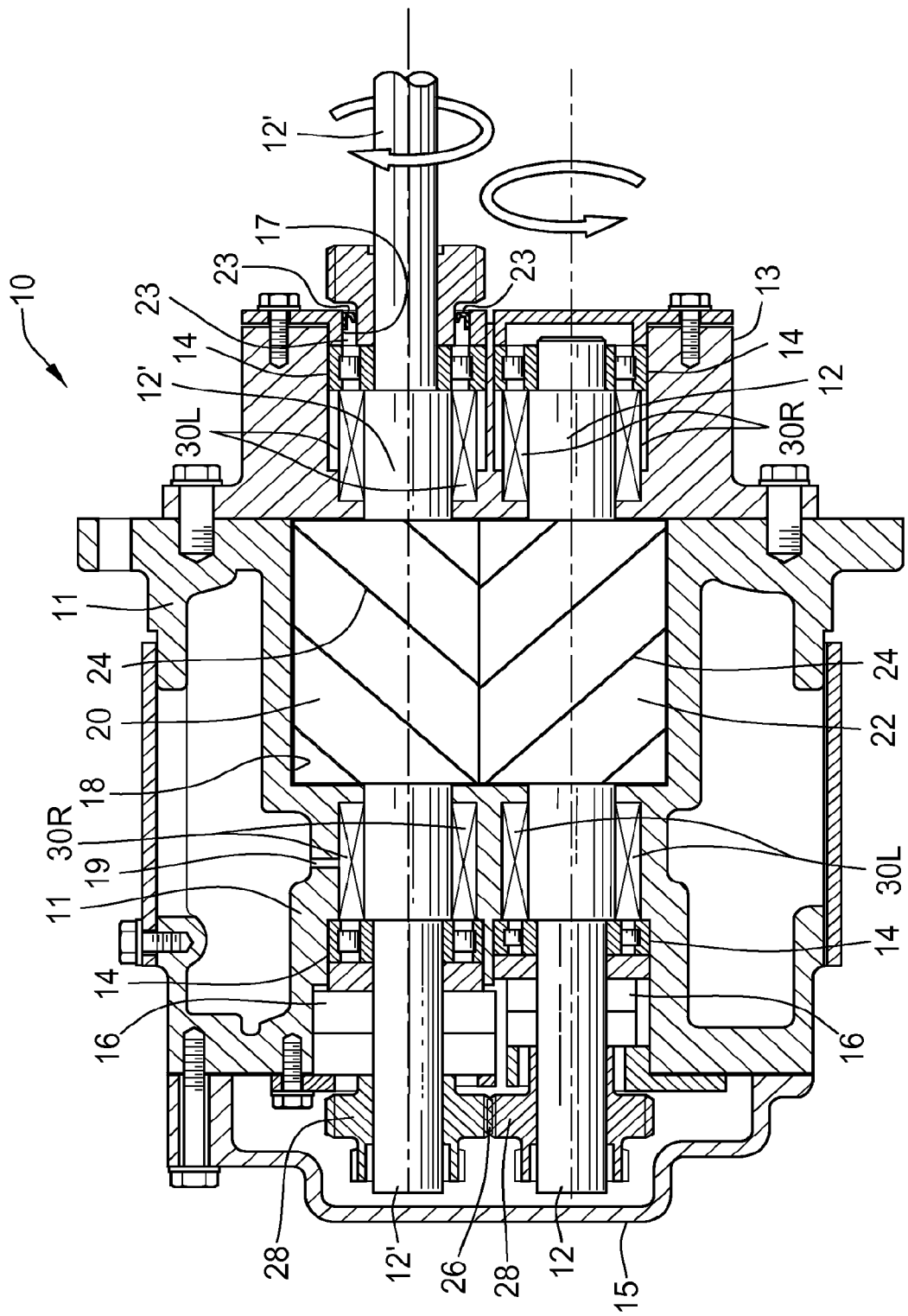
FIG. 1 is a transverse sectional view of a screw compressor having an oil-free type seal between the bearings and the compression chamber.

Referring now to FIG. 1, the known configuration of a rotary compressor 10 is shown as it is installed for compressing air or other gasses, and in which the seals 30L and 30R of the oil free type are used to retain the oil in the bearing compartments. The compressor 10 comprises a housing 11, mounted at one open end onto a housing mount 13, and covered by an end plate 15 connected to a second open wall of the housing 11, to define the space in which the elements of the compressor 10 are disposed. The housing 11 is attached to the hosing mount 13 and to the end plate 15 by and appropriate means, such as bolts as shown.

A pair of shafts 12, 12,' which rotate in opposite directions as shown by the arrows, are disposed within the housing 11. Rotation of the second shaft 12 is achieved by an appropriate coupling mechanism, shown in FIG. 1 as two gears 28 that are connected to and rotate with the shafts 12, 12'. Gears 28 include teeth 26 that engage each other causing the common rotation, albeit in opposite directions, of the shafts 12, 12'. As shown in FIG. 1, two different seals 30L, 30R are provided on each of shafts 12 and 12'. Since the shafts rotate in opposite directions, the type of seal 30L or 30R is defined by the direction in which the grooves of the oil must pump in order to maintain the oil free environment. This will be explained in greater detail below with reference to FIGS. 2-3C.

Each of the shafts 12, 12' are associated with and support a rotor 20, 22, respectively. Rotors 20, 22 are mounted in a compression chamber 18 of the housing 11. One of the shafts 12' extends through an aperture 17 in the housing mount 13 and is connected to a source of motive power (not shown), such as a motor, that causes the shaft 12' to rotate, thereby driving the compressor 10.

Fluid (gas) input and output openings (not shown in FIG. 1) permit the introduction of gas into compression chamber 18 at a low pressure and egress from chamber 18 at an elevated pressure through an output opening (not shown in FIG. 1). While described briefly herein, the structure and configuration of the separate elements of high rotational speed compressors, exact structure is not crucial to the invention, and will not be described in greater detail except as these interrelate with the inventive seal cartridges 30L and 30R. The structure and operation of high pressure compressors are known and reference is made to any of the prior patents listed above, for example, U.S. Pat. No. 4,487,563 to Mori et al., incorporated herein by reference, for a more detailed description of the structure of the compressor rotors 20, 22, housing 11 and other compressor elements, in contrast to those elements comprising the seals.

The shafts 12, 12' are supported within the housing 11 and are mounted on two sets of radial bearings 14 disposed at either side of the rotors 20, 22. For greatest precision and support, as well as for maintaining an oil free compression chamber 18, the requirement for which is known, the bearings 14 necessarily support the shafts 12, 12' outside the compression chamber 18. Between the bearings 14 and the rotors 20, 22 and outside the compression chamber 18, there are disposed a number of shaft seals, preferably housed in a cartridges 30L and 30R, as explained in greater detail below. The shaft seal cartridges are configured so as to seal against any fluid flow of fluids into compression chamber 18 from the ambient environment, including any oil that may be attempting to migrate from the bearing side. For the most part, these fluids that are to be avoided comprise oil or other lubricants that are provided for lubrication and cooling of the radial bearings 14. Lubrication is a requirement because of the high rotational speeds of the shafts 12, 12'.

Simultaneously, the shaft seal cartridges 30L and 30R are located close to the rotors 20, 22 and provide for sealing along the shafts, one set, for example seals 60, 60' (FIG. 2), are provided to prevent compressed gas (compressed air) from leaking to the outside from the compression chamber 18 while another set, for example seals 50 (FIG. 2), simultaneously maintaining the lubricant fluid (oil) from entering the space 46 outside the seal 50 or compression chamber 18 and polluting either the environment or the process gas being compressed, respectively.

The radial bearings 14 permit the shafts 12, 12' to cause rotation of the two rotors 20, 22, thereby bearing radial loads and maintaining the integrity of the elements of the compressor 10. Additional loading capacity is provided by action of thrust bearings 16 (FIG. 1) for bearing thrust loads. Alternatively, the axial load can be borne by a double roller bearing (shown in FIG. 3A) as is known in the art.

As can be seen, the shafts 12, 12' and bearing 14 configurations are provided so that the shafts 12, 12' are parallel to each other and vanes 24 on the surface of the rotors 20, 22 are maintained in meshing engagement with each other when the shafts are rotating. Shafts 12, 12' rotate in relatively opposite directions, as shown by the arrows, and thereby cause the compressors 20, 22 to also rotate in opposite directions relative to each other. The teeth 26 of gears 28 disposed at a distal end of the shafts 12, 12' are synchronized with the vanes 24 so that rotation causes the vanes 24 to mesh and thereby create the motive energy for compressing the low pressure process gas to a higher pressure when the shafts 12, 12' rotate at high rotational speeds.

In the configuration shown in FIG. 1, only one of the shafts, shaft 12' extends outside the housing 11, the shaft 12 being of shorter length so as to be completely within the housing 11 enclosed by the end plate 13. Conversely, shaft 12' is longer and extends externally of the housing to connect to a motor or other rotational motive force (not shown) that rotates the shaft 12 and rotor 20, which in turn by action of the gears 28 also rotates the rotor 22 and shaft 12. As the shafts 12, 12' and rotors 20, 22 rotate at high speeds, synchronized by the gears 28, the vanes 24 cause air or other gas that is introduced into the compression chamber 18 to be pressurized and be pumped out of the chamber through an output opening (not shown). The operation of the compression rotors 20, 22 and the other elements of the compressor 10 are known, and not of major significance to the present invention, reference being made to aforementioned U.S. Pat. No. 4,487,563 and to Nos. 4,781,553; 7,338,255 and others which describe the use of seals in impeller or rotary screw type compressors. The teachings of these references are incorporated herein by reference where appropriate.

Figure 2:
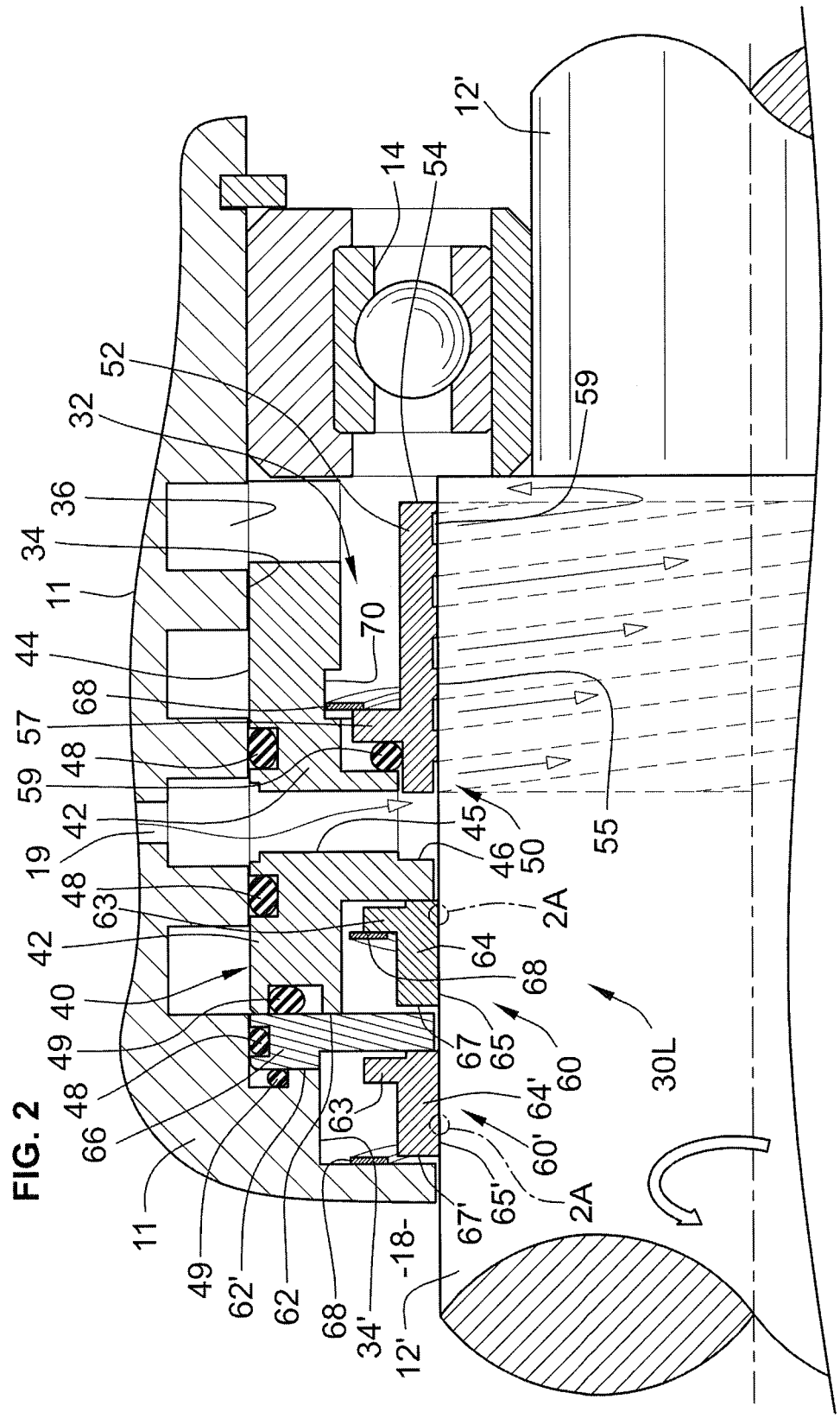
FIG. 2 is a detailed transverse sectional view of a first embodiment of the inventive seal configuration utilizable in the compressor shown in FIG. 1.

Referring now to FIG. 2, the sealing capacity of the inventive seal cartridges 50, 60 etc. are described. In FIG. 2, one embodiment of the inventive seals, for example, seal cartridge 30L of FIG. 1, is shown in greater detail. As understood by convention in the art, only the top half of the seal 30L is shown, the bottom half being understood to be a mirror image of the top portion, the convention being maintained for purposes of clarity. The configuration of the seal 30L is meant for smaller sealing cavities 32, where the shaft 12' is of a smaller diameter and there is not much space in the radial direction for disposing the seal cartridge 30L. Rotation of the shaft 12' is facilitated by the shaft bearing 14 held in the axial direction by a snap ring, as shown.

Because the seal 30L is disposed in a chamber of the housing mount 13, oil lubrication to the bearing 14 is provided through the aperture 17, which lubrication is necessary to reduce frictional forces and heat generation caused thereby. To provide for this function, oil is circulated through the oil side of the seal cartridge cavity 32 and through and around the bearing 14. As a means to maintain the oil within the desired chamber, a lip seal 23 may be interposed between the relatively rotating parts associated with the shafts and those and associated with the housing or end plate 13.

Seal cartridge 30L is disposed between the bearing 14 and the impeller or compressor chamber of the compressor. Cartridge 30L includes one or more central apertures that are vented to the ambient environment through a communicating network, identified and shown schematically in the form of conduits 19. The seal cartridge 30L seals the rotating shaft to avoid oil leaking across the relatively rotating parts, that is, from migrating along the surface of shaft 12', which is rotating relative to the housing mount 13, and relative to the stationary cartridge seal elements, which are shown in cross-section in FIG. 2.

The seal cartridges, for example, cartridge 30L, comprise as few components as possible in order to facilitate manufacture and assembly. The cartridge essentially comprises a first or oil seal 50, that inhibits oil leakage from the chamber containing the bearing 14 and a second set of seal modules, or seals, 60, and optionally, seals 60', etc. that seal against the leakage of process fluid from the compressor chamber (18 in FIG. 1, not shown in FIG. 2), but which would be located toward the left in FIG. 2.

The seal cartridge 40 comprises a seal carrier 42 that is configured and oriented to correspond to the space defined by the toroidally shaped seal cavity 32 defined by the surface of shaft 12' and the inner diameter 34 of the seal cavity 32. The outer diameter surface 44 of carrier 42 is slightly smaller than the diameter 34 of the seal cavity 32 and when it is inserted within the seal cavity, cartridge carrier 42 is sealed radially against the cylindrical surface having the inner diameter 34 by preferably, two, elastomeric O-rings 48, one seal ring sealing the carrier 42 associated with each set of seal cartridges 50, 60. Preferably, is also be axially sealed, for example, by one or more O-rings 49 disposed between one or more radially extending wall 62 (and optionally 62') and a corresponding radially extending wall of the housing 11, as shown. The carrier 42 includes a plurality of through holes 45 that provide for communication to any fluid that manages to escape from either of the seal modules 50, 60, 60' allowing the minimal escaping process gas to be vented to atmosphere and any oil leakage to be collected in a reservoir (not shown). The through holes 45 are in fluid communication with each other by means of a cylindrical communication channel 46 that collects fluid escaping through the seal modules and directs the fluids toward an available through hole 45.

It should be recognized that a seal cartridge 40 is disposed in each of the seals 30L and 30R (FIG. 1), whereas only one seal 30L is shown in FIG. 2. An additional, and optional, air seal 60' is shown as sealing directly between housing 11 and cartridge carrier 42, but this is only required when a more secure seal is needed, so that tandem seals 60, 60' are disposed adjacent each other to reduce leakage of process gas to atmosphere. During installation, seal module 60' would be inserted into the seal cavity 34' and the insertion of the cartridge 40 would proceed thereafter, together with the seal modules 50, 60. Insertion of the cartridge 40 into the seal cavity 32 would cause the radially extending wall of the cartridge carrier 42 to butt up against the radially extending wall of the head member 66, and seal thereagainst by the O-ring 48 as shown.

Each seal cartridge 40 contains two types of seals that are at least partially enclosed within the cartridge 40, and which comprise several seal elements. The embodiment of the seal cartridge 40 shown in FIG. 2 includes the two radial non-contacting seals 60, 60' for retaining and sealing against leakage of the process gas, located off the drawing figure toward the left side of the housing 11. Each of the two radial contacting seals 60, 60' are shown to have some, but not all, essentially identical elements. For example, seal rings 64, 64' both inhibit gas leakage along the shaft 12' by a very close tolerance fit against the surface of the shaft 12', the close tolerance causing the gap between the shaft and the inner diameter of seal rings 64, 64' to inhibit flow of gas therebetween. At least partially as a result of boundary layer effects, described in greater detail below with respect to FIG. 3D, the gas flow is reduced even for the greater pressure differentials across the seals 60, 60'. If the pressure of the gas is expected to be excessively high, additional seals may be interposed so that the reduction in the gas pressure between any one seal is not so great as to affect the integrity of the seal.

Each of the stationary seal rings 64, 64' has a sealing face that contacts a stationary surface, a flat radially extending surface of head member 66, as shown, and also has a sealing interface 65 opposed to the surface of the shaft 12'. Thus, seal ring 64 is in contact with and statically sealed against a radially extending surface of the seal ring cartridge carrier 42. To maintain the static sealing faces in contact, one or more wave springs 68 are disposed between another radially extending surface of the seal rings 60, 60' and of the housing 11 and the head member 66, respectively, which members are not relatively rotating, as shown. The use of wave springs 68 is a feature of the invention as will be described in more detail with respect to FIG. 5 below.

As described, several O-rings 49 are disposed on the back faces of the head member 66 and about the cartridge seal carrier 42 to ensure sealing between the non-rotating elements of the seal 30L. Optionally, additional O-rings (not shown) may be interposed between the front radially extending face of seal flange 63 and the radially extending surface of head member 66 to ensure a more stable static seal between seal ring 64 and the head member 66. Identical considerations are applicable with respect to the interface between the seal ring 64 and the carrier 42.

Very close tolerances of the elements are required to provide the benefits of this invention, since the heat generated by friction will cause deformations and other anomalies that result in formation of gaps if the elements are not maintained closely together. Ideally, the seal rings 64, 64' comprise a similar material, for example, stainless steel, to that of the shaft 12'. Alternatively, the material of the seal rings 64, 64' has a coefficient of expansion that substantially matches that of the shaft material over a wide range of temperatures, so that expansion resulting from frictional heating of the elements does not affect the gap to be sealed therebetween. The significant feature of the seal rings 64, 64' is that they are capable of expanding at essentially the same rate as the surface to which they are sealing against, i.e., the surface of the shaft 12, 12', or surface 136 of a shaft sleeve 210 (FIG. 3A), as will be described below.

Although the seal rings 64, 64' are shown as having a common shape, and the seals 60, 60' are identical except for location, this feature is not a necessary part of the invention. Other sealing configurations may have different seals in the air seal location, for example, a labyrinth axial seal (such as is described below with reference to FIG. 3A) and a second contacting seal, and even a tandem seal is not needed in some instances. The cogent feature of these seals 60, 60' is that they provide a good seal for inhibiting leakage of the process fluid to the greatest extent possible, even though some leakage is to be expected. While some gas leakage may be tolerated through the air seal(s) 60, 60', etc., the leakage is preferably kept to a minimum, thereby efficiently and effectively maintaining the pressures generated in the compressor chamber at desirable levels.

As described herein, the very close tolerances of the elements are required in order to provide the benefits of this invention, since the heat generated by friction will cause gaps to form if the elements are not maintained close together. Ideally, the seal rings 64, 64' comprise a similar material, for example stainless steel, to that of the shaft 12'. Alternatively, the material of the seal rings 64, 64' has a coefficient of expansion that matches that of the shaft material over a wide range of temperatures, so that expansion resulting from frictional heating of the elements does not affect the seal therebetween. Although the seal rings 64, 64' are shown as having a common shape, and the seals 60, 60' are identical except for location, this feature is not a necessary part of this invention. Other sealing configurations may have different seals in the air seal location, for example, a labyrinth axial seal (such as is described below with reference to FIG. 3A) and a second contacting seal, and even a tandem seal is not needed in some instances. The cogent feature of these seals 60, 60' is that they provide a good seal for inhibiting leakage of the process fluid to the greatest extent possible though some leakage is to be expected. While gas leakage may be tolerated through the contacting seal(s), the leakage is kept to a bare minimum, thereby maintaining the pressures generated in the compressor chamber.

A second seal module 50 is provided for retaining oil within the bearing chamber 32. Seal module 50 is interpositioned between the bearings 14 and the vent to atmosphere comprising through hole 45. The seal elements comprising the labyrinth seal axial seal module 50 are also a feature of the invention, as the seal ring 52 provides axial sealing between the chamber containing the bearing 14 and the throughhole 45 communication with conduit or vent passage 19 extending through the housing 11, and itself communicating with atmosphere. The conduits 45 that are bored essentially radially through the circumferentially extending wall of carrier 42 provide fluid communication out of the seal cavity 32 for any process gas or lubricating fluid that escapes through the seal modules 50, 60, 60' and to at least one conduit or passage 19 communicating from the seal cavity 32 to atmosphere. As is shown in the cross-sectional view of FIG. 2, and in the perspective exploded view of FIG. 5 of a corresponding carrier 142, the cylindrical channel 46 in the inner diameter surface of the carrier 42 provides communication around the inner diameter of the seal carrier 42 for egress of fluids from the seals through the carrier and housing 11 to atmosphere.

The configuration of the oil seal 50 permits the oil seal ring 52 to be radially movable, that is, that the air seal ring 52 is capable of motion relative to the carrier in the radial direction, while maintaining the seal between the inner diameter surface 55 of the seal ring 52 and the shaft surface. The seal module 50 comprises a radial and axial shaft seal for sealing against oil leakage. The inner diameter surface 55 of oil seal ring 52 includes one or more spiral grooves 59 that are shaped and configured to "pump" air from the recessed cylindrical channel 46 against the oil leakage path along the surface of the shaft 12'. The air may be either atmospheric air that is provided through the conduit 19 and through holes 45, or it may be process gas that has leaked from the compression chamber through the seal modules 60, 60', or a combination of the two.

It should be appreciated that although the seal ring 52 is stationary, and the grooves themselves are not considered to pump air in the conventional sense, that is, by means of the formation of a boundary layer of air, adjacent both the surface of the shaft 12' and the inner diameter surface of the seal ring 52. The boundary layer effect retains that layer of the air closest to a surface, whether the surface is stationary or rotating, which effect is diminished the further from the surface that is measured. It should be further understood that the boundary layer effect also provides for a much greater effect on the rotating shaft 12, 12' in that the shaft preferably has been treated to provide a greater amount of frictional air resistance than the stationary surfaces and thus because of the enormous shaft rotational speed creates much more turbulent air flow around the shaft or shaft sleeve surface. Thus, as the shaft rotates, the boundary layer effect "pulls" the air along the direction of rotation of the shaft surface, and it is being rotated with the shaft. The air is directed by the grooves 59 on the stationary seal ring inner surface 55 in the direction of the arrows as shown within the phantom lines of the air seal ring 52 and in the rightward direction as viewed in FIG. 2.

Additional elements of the oil seal module 50 include an O-ring 59 disposed between two radially extending surfaces, one on the inner seal cavity of carrier 42 and the other on a circumferentially extending flange 57. O-ring 59 seals between these two relatively stationary surfaces. The back face of the seal ring flange 57 is also utilized as a base for bearing the biasing force of preferably at least one wave spring 68, as shown in FIG. 2, and optionally two wave springs, that bias the seal ring flange 57, and thus the seal ring 52, toward the O-ring 59 to maintain the seal between the axially extending surfaces. For easy snap-in insertion of the wave spring(s) 68, an inner diameter surface of the carrier 42 includes an annular groove 70 extending circumferentially and is slightly larger that the axial dimension of the wave spring(s) 68 when compressed. Alternatively, one wave spring 68 can be inserted within the groove and a second optional open ended washer (not shown) can comprise a base on which the wave spring 68 can exert a biasing force on the flange 57. Since the wave spring 68, and the optional washer (not shown) are open-ended, a slight radial compression will permit their insertion into the groove 70, and when the radial compression is removed from the outer diameter edges, the spring will snap back to its rest configuration and be fully engaged in the annular groove 70.

Figure 5:
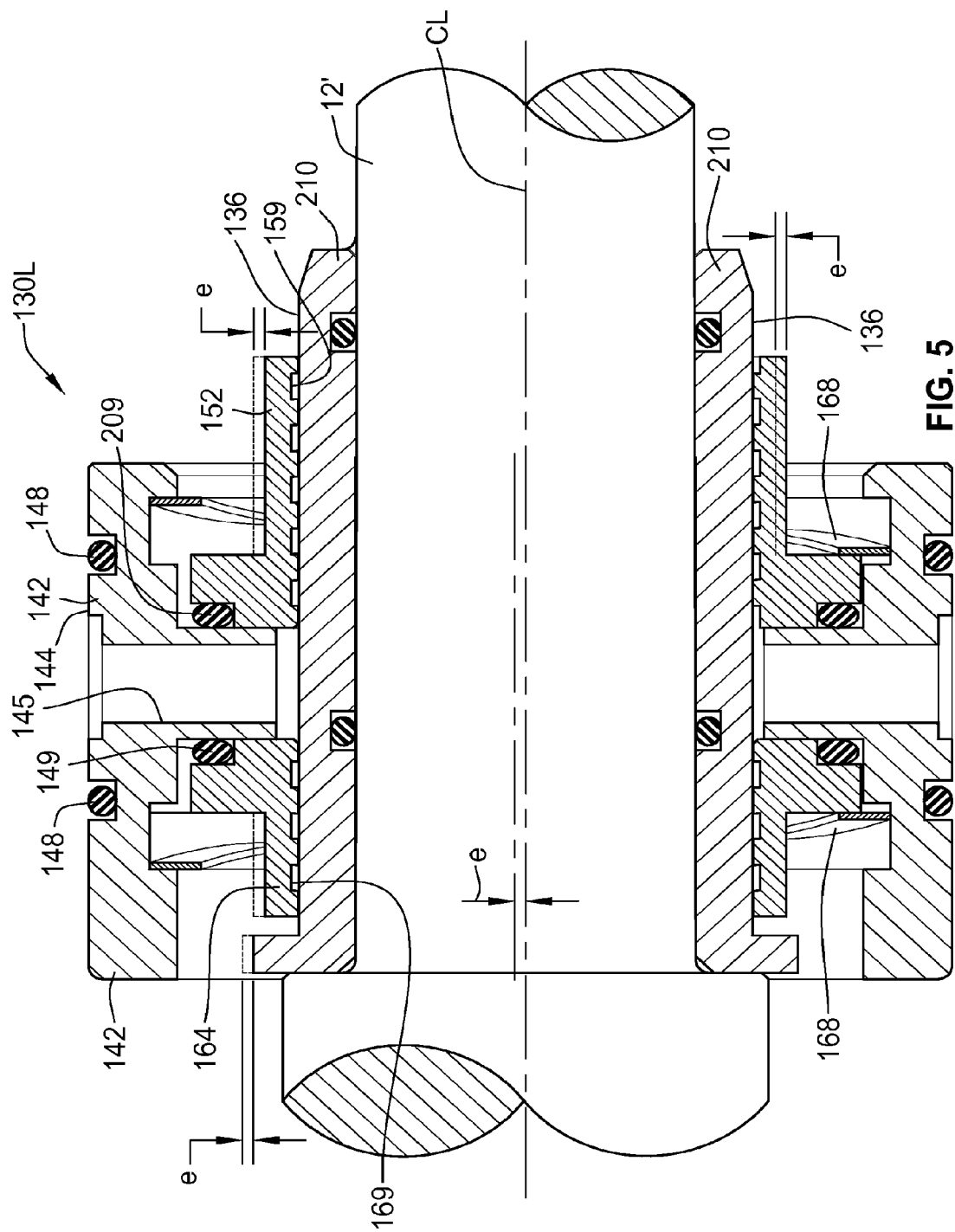
FIG. 5 is a partial cross-sectional view of the seal cartridge shown in FIG. 3A showing the capability of the seal rings to float radially within the seal cavity.

Both seal module types, the module 50 for maintaining the oil within the bearing chamber 32 and the process gas seal modules 60, 60', are configured within a space in the cartridge carrier 42 so that they are permitted a freedom of motion in the radial direction as well. As is shown in FIG. 5, even the best efforts to construct a shaft that does not have an eccentric rotation, that is, that does not deflect or wobble during its rotation, undergo changing conditions after a period of use or with changing environmental conditions. As shown in FIG. 5, the shaft can take on an eccentric or non-symmetrical rotation, which would necessarily cause the seal elements, e.g. seal rings 52, 64, 64' to also and simultaneously oscillate in the radial direction with the shaft 12'

As described in greater detail with respect to FIG. 5, the seal rings shown in FIG. 2, that is, seal rings 52, 64 and 64' will oscillate slightly in the vertical direction as shown in the cross-sectional view of FIG. 2. This oscillation can be compensated for because the sealing surface has some, albeit limited, capability of repositioning in the radial direction with respect to the stationary sealing surfaces on the radially extending walls of the carrier 42 and the head member 66. Each seal ring 52, 64, 64' has the freedom to "float" radially relative to the carrier 42 and housing 11, giving it the ability to continuously and instantaneously align itself to achieve a concentric position with respect to the axis of shaft 12'. Freedom to float in respect of the sealing contact surface permits tighter clearances to the shaft since the seal rings are not rigidly constrained to the carrier 42, housing 11 or end plate 13 (FIG. 1), which permits the seal elements to expand with the shaft 12' in response to temperature changes or other factors during compressor operation. To achieve this, the inside diameter of the seal rings must be sized to be extremely close to the outside diameter of the shaft 12' relative to which the seal rings rotate.

In the contacting embodiment of FIG. 2, the wave springs 68 urge the oil seal ring 52 into contact with a mating planar surface of the carrier 42. The O-ring 59 is captured between the two components so that it is compressed by a specific amount to prevent oil flow between the radially extending surfaces, while still allowing the oil seal ring 52 to float radially and locate itself concentrically with the shaft 12'.

One significant feature and distinct advantage of the inventive seals is that by maintaining the very close tolerances, and as described below, doing so under high pressures and temperatures generated in the seals and by the compressor, the sealing capacity is increased. That is, because the tolerances are maintained in a larger range of temperatures and pressures, the gap is during normal operation of the compressor maintained within a tight and essentially constant range.

Figure 3A:
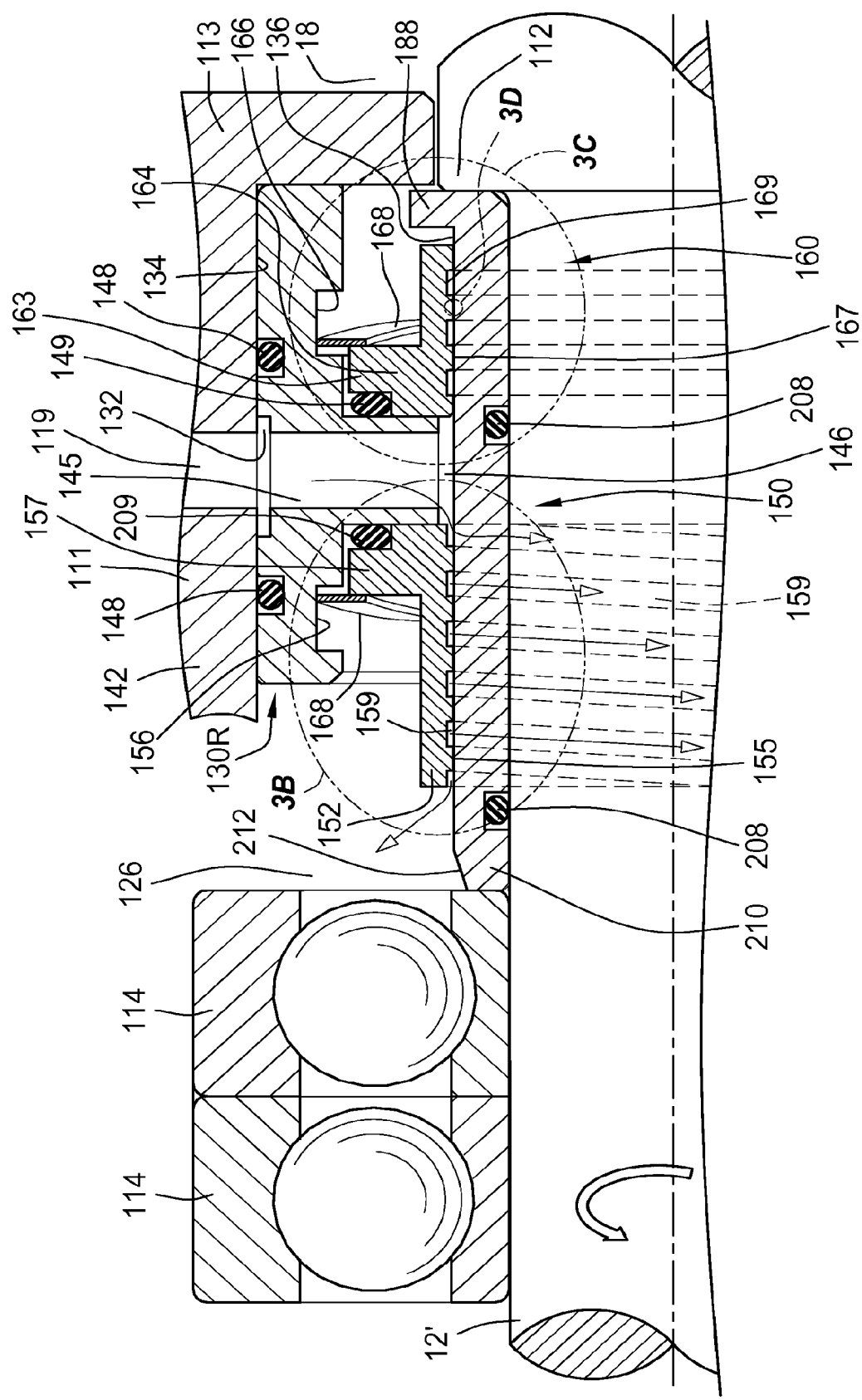
FIG. 3A is a detailed transverse sectional view of a second alternative embodiment of the inventive seal configuration utilizable in the compressor shown in FIG. 1.

Referring now to FIG. 3A, a second embodiment of the inventive high pressure gas seal cartridge 130R is shown. As can be seen from FIG. 3A, the seal cartridge 130R is on the opposite side from the compression chamber housing the rotors 20, 22 (FIG. 1), than the cartridge 30L described above with reference to FIG. 2. Since some of the elements are the same for both the seal cartridges 30L and 130R, similar identification numbers are used for similar parts, the identification numbers in the embodiment of cartridge 130L in FIG. 3A having a 100 series prefix. For example, instead of a single bearing for the shaft 12', there are dual bearings 114 that provide radial bearings to support the shaft 12', as shown to the left of the seal cartridge 130L. Ball bearings 114 provide a smooth bearing of the load of shaft 12' and limit the amount of eccentric "wobble" of the shaft 12' relative to the housing 111 into which the cartridge 130R is inserted. Housing 11 also includes one or more fluid communication passage 119 that permits the seal cavity chamber 132 to evacuate any gases that flow into the chamber. Another throughhole (not shown) may be disposed at a lower part of the housing to permit the evacuation of any lubricant or liquid that may find itself into the chamber 132.

The seal cartridge 130R is similar in some respects to the seal cartridge 30L described above, and the similarities will be specified herein to show the features and elements of the present invention. For example, both of the seal cartridges are disposed between a lubricated (usually by lubricating oil) bearing combination (14, 114) and a compressor chamber 18 (FIG. 1). Both cartridges have a central throughhole (45, 145) that can communicate with passage (19, 119) in the respective housings (11, 111). Both seal between the housings 11, 11 and the shaft 12' against fluid leakage along the shaft surface.

A major difference in the two seals 30L, 130R, as shown in FIG. 3A, is that a shaft sleeve 210 is disposed between the cartridge carrier 142 and the surface of shaft 12'. The shaft sleeve 210 is an optional, and not a necessary, part of the invention. The shaft sleeve 210 has a closely controlled outside diameter surface 136, which rotates very closely within the air seal ring and oil seal ring elements of the seal modules. Alternately, the shaft itself may provide the sealing interface at its outer diameter surface 136. An angled end 212 of shaft sleeve 210 assists in insertion into a seal cavity.

Once assembled, the air and oil rings align themselves around the sleeve and function as an effective seal through fluid dynamics created as a result of the small controlled circumferential clearance between the static seal rings and rotating shaft. The shaft sleeve 210 may be disposed in those applications where the shafts 12, 12', cannot be machined with the desired precision to provide a seal between the shaft surface and non-rotating elements, such as the inner diameters of oil seal ring 152 and air seal ring 164. When such precision machining of the shaft surface is available, as in the embodiment shown in FIG. 2, the seal ring can ride directly on the surface of the shaft. However, the shaft sleeve 210 provides additional benefits when uneven heating or heat generated deformation of the elements due to thermal expansion is expected.

Shaft sleeve 210 rotates with the shaft 12' and is sealed against the surface thereof by one or more O-rings, two O-rings 208 being shown in FIG. 3A. The cartridge carrier 142 is disposed around the sleeve 210 and houses at least two seal rings, the oil seal ring 152 and the air seal ring 164. Additional rings, either within an expanded version of the carrier, or outside the carrier 142, as in the first embodiment shown in FIG. 2, can be included, but these are not shown for purposes of clarity and economy. For example, in higher-pressure applications, multiple air rings may be used to distribute the pressure drop and provide a more effective leakage barrier against the leakage of process fluid form the compression chamber.

Figure 2A:
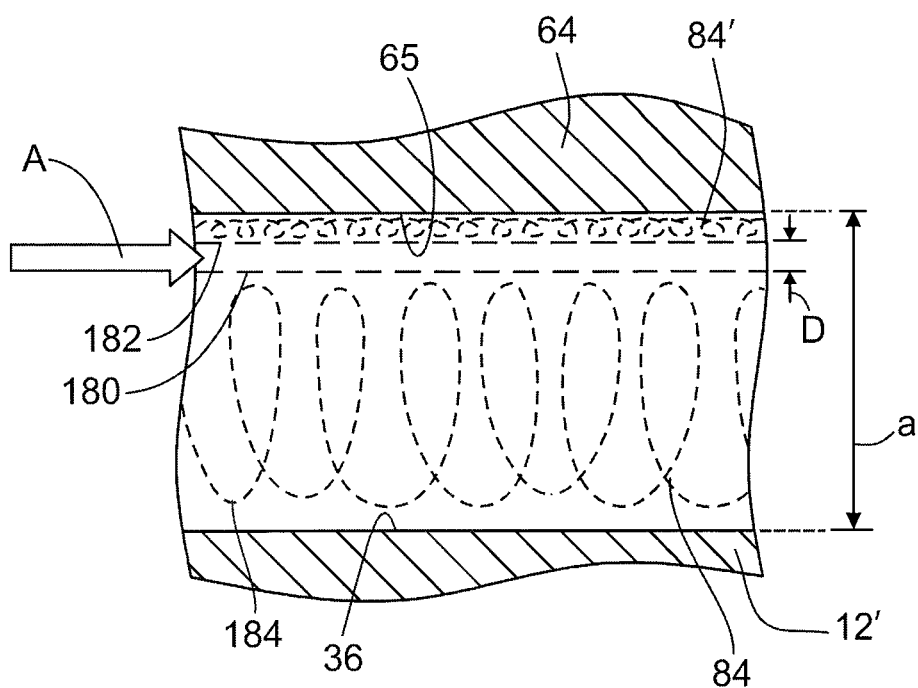
FIG. 2A is a detail view, on an enlarged magnified scale, of the gap and seal interface between the shaft and the inner diameter of one seal ring shown in FIG. 2.

Shaft sleeve 210 has at one end disposed an upturned circumferential flange 188, which abuts an indented larger diameter portion 112 of shaft 12' acting as a stop so as to inhibit further movement in the axial direction of the shaft sleeve in the axial direction toward the right in FIG. 2A. The housing 111 also includes a flange 113 that extends inwardly toward the shaft 12' and which does not come into contact with the indent 112 of the rotating shaft 12'. The shaft seal includes a smooth cylindrical surface 136, machined to a high level of precision, upon which ride the inner diameter surfaces of the two rings 152 and 164. The machining precision is necessary for the shaft as it will cooperate with other elements to form and maintain a close tolerance in the shaft seals. It should be noted that both the seals defined by the opposing surfaces 136, 155 and 136, 167 on either side of the fluid communication passage 119 are axial seals, as will be explained in further detail below. As will be explained, the very close tolerances of the machined surfaces of the shafts 12, 12', the shaft sleeve surface 136 and the inner diameter surfaces, e.g., 59, 155, 167 of the axial sleeve seal rings, is a very significant feature of the present invention as it is the minute annular gap between the opposed sealing surfaces that provides the seal capacity of the axial seals. Because the close tolerances in manufacturing of the sleeve the shafts 12, 12' and the and the inner diameter surfaces, e.g., 59, 155, 167 of the axial sleeve seal rings 152 and 164 are maintained, the gap a (FIGS. 2A and 3D) remains in a range of from about 0.002 to about 0.004 inch (0.051 mm to 0.102 mm).

Referring now to FIG. 2A (not shown to scale, because the gap a is too small relative to the seal rings 64, 64'), two relatively rotating surfaces, for example, 36, 65 are shown in the general configuration of two concentric cylinders with an annular gap a therebetween. The shaft 12' or sleeve 210 (when used) has an outer cylindrical surface 36 and the inner diameter of the seal ring 64 has an internal diameter cylindrical surface 65 opposed thereto. The gap a between the surfaces is retained in a very close band by the internal pressure of the pressurized process gas acting radially on the seal rings to self-align them relative to the opposed sealing surfaces. While the shaft 12 is rotating, the surface 36 is generating a turbulence shown schematically by lead line 84, that impedes the flow of process gas from the compressor chamber side 18 and reduces as much as possible the form of process gas into conduit 45. The barrier to the escape of process gas that is provided by the small gap a is further enhanced by the surface effect layer 182 that by means of frictional air resistance the closer to the surface 65 that is being measured. That is, there is a layer 182 of fluid that does not readily permit flow in the gap a and between the boundary layer 180 and the surface effect layer, the resulting small gap D that is available does not readily permit the outflow of process gas A through the gap D.

The carrier 142 is stationary and is mounted to the compressor housing 111 within cartridge seal cavity 132, similarly to the carrier 42 of the first embodiment shown in FIG. 2. It is sealed against fluid leakage by means of O-rings, two O-rings 148 which are shown in FIG. 3A. One or a plurality of central throughholes 145 for permitting fluid communication to the ambient environment outside the seal cavity 132 through one or more passages 119. Although not shown in the embodiment of FIG. 3A, additional O-rings, similar to the O-rings 49, may be provided to seal between the radially extending faces of the respective carrier end and a hosing wall for extra sealing capacity when high pressures are expected.

The oil seal ring 152 is provided for sealing the lubricating oil from leakage along the shaft surface from the bearing chamber 126 toward the throughholes 145 between the two seals 150, 160 in the cartridge carrier 142. It is very similar in structure and in function to the embodiment of oil seal 50 shown in FIG. 2, with a significant exception, that being the orientation of the grooves 159. Because the seal module 150 is on the left side portion of the compressor chamber 18 as shown in FIG. 1, the orientation of the spiral is required to provide a partial pressure of air pumped from the throughholes 145 toward the bearings 114, and also pumps oil migrating along the shaft sleeve surface 136 back toward the bearings 114. That is, the direction and profile of spiral groove 159 corresponds to the direction of rotation of the shaft and assists leaking oil back toward the oil reservoir in the bearing chamber 126 and away from the common fluid communication passages, including the throughholes 145, passage 119 and cylindrical channel 146 adjoining the air ring 164 and oil ring 152.

Figure 3B:
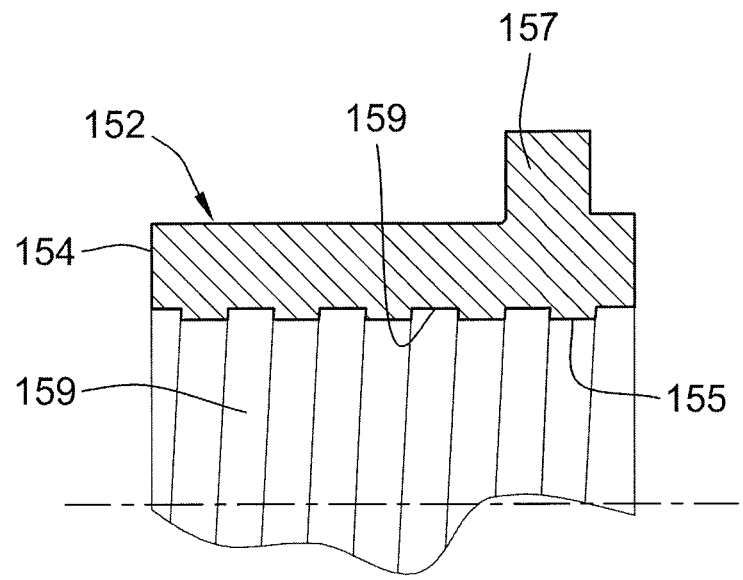
FIG. 3B is a detailed cross-sectional cutaway view of the cylindrical oil seal ring shown in the alternative embodiment seal configuration of FIG. 3A having spiral grooves.

The oil and air are, strictly speaking, not pumped in the sense of a vane or impeller. Instead, the oil and air are directed and caused to pass from the right toward the left as shown by the arrows traversing the grooves 159 (shown partially in phantom) by means of hydrodynamic effects and pressure differentials generated by the relative rotation, for example, between the outer surface 136 of shaft sleeve 210 and the minor diameter 155 of the seal ring 152. The inside diameter 155 of the oil ring 152 is sized to be extremely close to the outside diameter 136 of the shaft sleeve 210 against which it seals for different temperatures, so as to maintain the sealing capacity during operation of the compressor when the frictional heating is expected to raise the temperatures of the elements significantly, and possibly unevenly The shape and orientation of the spiral grooves 159 are shown in greater detail in FIG. 3B. The part of the ring 152 previously hidden in FIG. 3A is shown in broken away outline in FIG. 3B. The detail illustrates only a partially broken away sectional view of the upper portion of the oil seal ring 152, showing the inner diameter surface 155 defining the spiral grooves 159. Although the cross-section view of FIG. 3B shows only a portion of the threads or spiral grooves 159, it is evident that as the air or oil adjacent the surface facing the inner diameter surface 155 engages the threads during relative rotation of surfaces 136 and surfaces 155, 159 of oil ring 152, the air/oil combination will be directed and pushed toward the desired direction away from the common passages. The "pumping" effect is further aided by the higher partial pressure of escaped air or process gas present in the cylindrical channel 146. The air or process gas that is constantly pushing against the oil that is trying to migrate along the surface of the shaft 12, 12' or shaft sleeve 210 creates an equilibrium along the gap between the relative rotating surfaces. Depending on the conditions, e.g., temperature, gap size, relative pressures on either side of the seals, etc., which may vary over time, the equilibrium point along the gap may also change, but during normal operation, the equilibrium will be somewhere along the seal interface between the surfaces of ring 152 and the shaft 12' or shaft sleeve 210.

In other respects, for example, the presence of an O-ring 209 on a back surface of a flange 157 and the wave spring 168 biasing the seal ring 152 against the radially extending wall of the cartridge carrier 142 are the same as the earlier described embodiment. The oil seal ring 152 has the freedom to radially "float" relative to the carrier 142 and to oscillate with any eccentric motion of the shaft 12 or 12' and sleeve 210 as will be described below with reference to FIG. 5. This capability permits the inner diameter surface 155 of the oil seal ring 152 to maintain tighter clearance to the shaft 12' because the seal ring aligns itself to a concentric position with the shaft axis. The capability remains in most phases of operation since oil seal ring 152 is not rigidly constrained to the carrier 142 and may change shape as a result of thermal expansion together with the shaft in response to temperature changes during operation. During self-alignment during the assembly and or start-up of shaft rotation, and in compensation for slight variations in the tolerances or dimensions, the pressures of the fluids in the gap will normally center the surfaces of the rings relative to the surfaces of the shaft or shaft sleeve so that the surfaces will be maintained in a concentric relationship during operation.

Figure 3C:
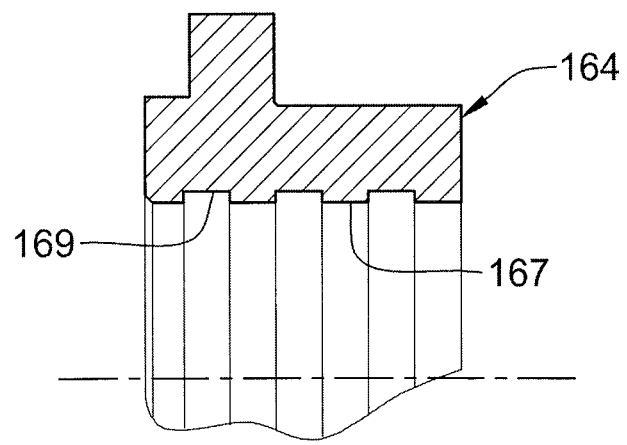
FIG. 3C is a detailed cross-sectional cutaway view of the cylindrical air seal ring shown in the alternative embodiment seal configuration of FIG. 3 having parallel grooves.

On the air ring sealing module 160 side of the seal carrier 142, and as shown in greater detail in FIG. 3C, an air seal ring 164 is disposed between the compressor chamber 18 on the pressure side and the common fluid communication passages, including the throughholes 145, passage 119 and cylindrical channel 146 on the downstream or depressurized environment on the other side. The air seal ring 164 also has a limited amount of freedom to "float" radially relative to the carrier 142, providing the ring 164 the capability of self-aligning to a concentric position with the shaft axis so as to maintain tighter clearance to the shaft 12'. The capability is afforded by the lack of a rigid radial constraint on the seal ring 164 as the O-ring 149 presents a pliable element on which the air seal ring face in contact with O-ring 149 is free to float. The air seal ring 164 is also afforded some freedom of motion in the axial direction to absorb axial transposition of the shaft 12'.

The air seal ring 164, and especially the inner diameter surfaces 167 thereof, are precisely machined to close tolerances so that they are just slightly larger than the outer diameter of the sleeve 210, or the shaft 12' if an air ring is used to seal directly over a shaft surface (instead of using the air seal rings 60, 60' shown in FIG. 2). For ease in description herein, only the air seal ring 164 will be described, but it should be evident that, alternatively, a grooved air seal ring may also be used in the embodiment of FIG. 2 or other embodiments that will become clear to a skilled person once an understanding of the present invention is attained.

Air seal rings 164 have the ability to self-align radially once installed over the shaft 12', so that the surfaces 167 and the shaft sleeve surface 136 remain completely non-contacting after compressor rotation startup. The air ring inner surface 167 will align itself close to concentricity around the sleeve 210 (or shaft 12'), maintaining a very small annular gap clearance between surface 167 and the surface of the sleeve 210 (or shaft 12'). However, the seal ring surface 167 should not contact with these surfaces during normal operation following initial startup, as the lubricating air between the two surfaces 136, 167 will develop enough pressure to maintain a gap separation between the relatively moving surfaces.

Figure 3D:
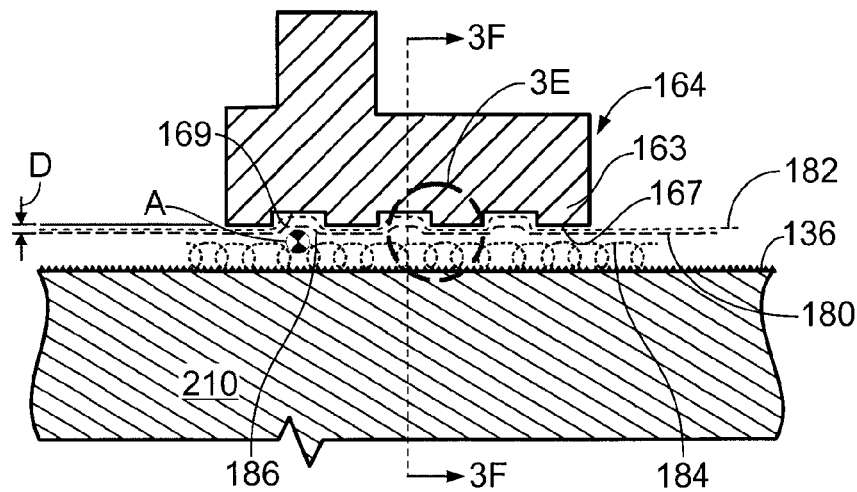
FIG. 3D is a detail view, on an magnified scale, of the suction-side shaft portion shown in FIG. 1.

The surface finishes of the sleeve 210 (or shaft 12') and inside diameter 167 of the air seal rings 164 are required to be precisely finished to a surface condition which promotes the formation of boundary layers of maximum thickness between these components, as shown in the greatly magnified cross-sectional view of FIG. 3D. The boundary layer effects are caused by the spinning motion of the air immediately adjacent the outer surface 136 of the shaft sleeve 210, which is thought to some extent to "adhere" because of frictional air resistance to the surface which caries it along with the rotation thereof. The boundary layer effect is enhanced by the use of a roughened surface of either the surface 136 of the shaft sleeve 210 or surface 36 of shat 12', as is shown in FIGS. 3D-3F and explained below.

To further enhance, for example, the surface effect air flow 184 close to the surface 136 of the shaft 12' and increase the turbulence effect on the boundary layer 180 generated by rotation of the surface of the shaft 12, 12' (FIG. 2A) or shaft sleeve 210 (FIG. 3D) by causing additional turbulence to be created, the surfaces, for example, surface 136, may be roughened by an appropriate surface treatment so as to increase surface roughness and increase frictional resistance to air flow when the shaft 12,12' is rotating. Such roughening is shown in schematic (not to scale) representation of surface 136 in FIGS. 3D-3F. An appropriate method of increasing surface roughness may include any one or more known methods, such as acid etching, abrading, burnishing, grinding with a grinding or rubbing with a fine steel wool. Care must be taken in creating roughness, however, so as not to alter appreciably the close tolerances described above.

Referring now to 3D-F, the boundary layer effect, creating a continuously fluctuating boundary layer 180, will be described in reference to the turbulence caused by the rotation of the shaft 12, 12', or the shaft sleeve 210, if a shaft sleeve 210 is used, as is preferred. An additional effect, the surface layer effect, also operates to a slight degree to generate a second boundary 182, resulting from the frictional air resistance adjacent a solid unmoving surface of the shear fluid flow of the moving fluid and the tendency of surface air flow to be restrained as one measures at a point closer to the surfaces 167, 169. Although there is some negligible effect from the surface layer boundary effect so as to restrain air flow through the gap a between the relatively rotating parts, this effect is essentially discounted relative to the boundary layer effect, which is indicated by the relative large sizes of the boundary layer 180 relative to the surface layer 182 shown in FIGS. 2A and 3D. The majority of the air flow is as shown by the arrows A which in the illustration of FIGS. 3D and 3E is shown to traverse into the surface of the plane, and in the cross-sectional view of FIG. 3F to traverse from right to left within the helical groove 159.

Figure 3E:
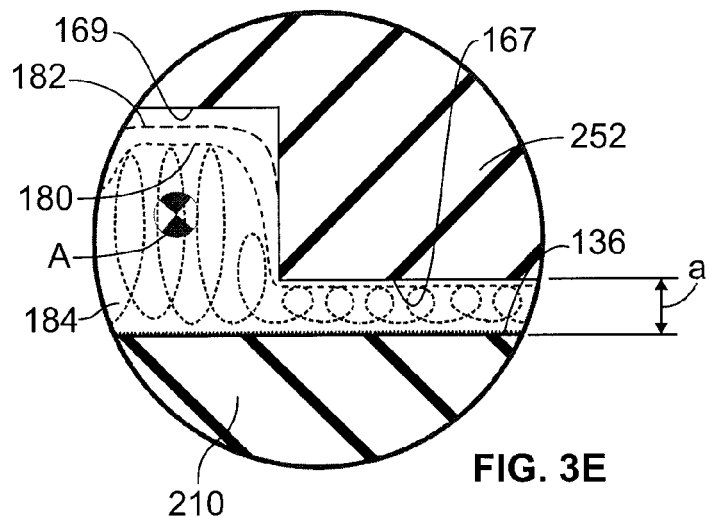
FIG. 3E is a detail view, on an enlarged magnified scale, of the axially extending seal interface between the shaft sleeve and the seal ring inner diameter surface shown in FIG. 3D.
Figure 3F:
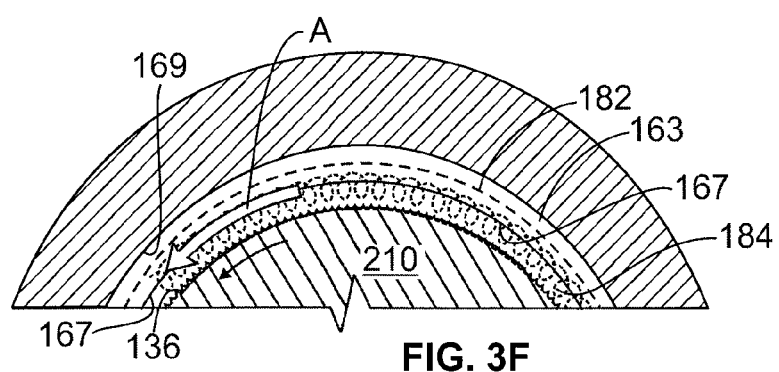
FIG. 3F is a cross-sectional view detail view, taken approximately along the line 3F-3F of FIG. 3, illustrating in an end view a portion of the seal interface shown in FIG. 1.

Referring now more specifically to FIG. 3E, a detail view of the gap a and the schematic representation of the boundary layer 180 and surface layers 182 are shown. Represented by the broken lines 184, the much greater turbulence caused by the rotation of the shaft 12, 12' or the shaft sleeve 210, optionally enhanced by the special treatment of the surface, for example, shaft sleeve surface 136, maximizes the turbulence. As shown in FIGS. 3E and 3F, the turbulence that is generated by the rotation of the shaft 12, 12' extends to a boundary 180 that is large enough to extend to the spiral grooves 169 defined within the inner diameter surface of the stationary seal ring 164 by the lands 163 that end in the surfaces 167. That is, the turbulence caused by the rotating shaft is great enough that it can form undulations that extend within the groove 169 such that the air flow A within the helical groove 169 is almost completely restricted to move along the groove 169 in the direction of arrow A best seen in FIG. 3F. The spiral grooves 169 are capable of generating sufficient air pressure at the outer end adjacent the back surface 154 to be able to push back any pressurized lubricant or oil that may be present so as to maintain a seal in the gap and totally inhibit any backward flow of oil along the shaft sleeve surface 136, thus causing an effective non-contacting seal. As shown in the cross-sectional view of FIG. 3F, the boundary layer 180 extends radially beyond the inner diameter surface of the lands.

The convergence of the boundary layer 180 to the inner diameter surface 167 of the spiral grooved seal ring 164 further restricts the ability of gas to flow freely, and forces the air flow of the buffer gas to flow along and through the groove 169 into the plane of the paper (FIGS. 3D and 3E) and along a counterclockwise path (FIG. 3F), as shown by arrow A. The surface effect layer 182 results from the known fluid flow characteristic that a fluid, such as gas or oil, will flow slower in a shearing gas flow the closer the fluid is flowing to the surface 16, but because the turbulence created by the rotation of the shaft 12, 12', this effect is negligible.

The boundary layer 180 is formed as a result of turbulent air flow 184 adjacent the surfaces 136, which is caused by the increased rotational speeds that the two surfaces rotate relative to each other. Reducing or constricting the gap D between the boundary layer 180 and surface effect layer 182 reduces the amount of escaping process gas that can leak out between the two surfaces 136, 167 and 36, 65 (FIG. 2A). The boundary layer 180 and surface effect layer 182 have relatively small dimensions, and it is desirable to decrease the gap D between the two relatively rotating surfaces 136, 167 and 36, 65 (FIG. 2A) as much as is possible to avoid leakage of the process gas being compressed. Any process gas that passes through the annular clearance between air seal ring 164 and surface of the sleeve 210 or shaft 12' enters the common throughhole 145 disposed toward the center of the carrier 142. The common throughhole 145 is vented through the housing 111 to atmosphere by the passage 119, or alternatively, may be transported back to the inlet side of the compressor chamber 18 for compression. At the same time, the process gas, or optionally a buffer gas, such as air, in the passage 119 can be utilized and injected into the spiral groove 169 to provide the fluid barrier in the groove as described herein.

The tolerance and close concentricity of the two surfaces 136, 167 is a feature that is greatly desired, as this feature should be maintained throughout a large temperature range over which the seal elements will be subjected during operation. It is known that because of thermal expansion of metals, carrier 142, seal rings 152, 164 and other elements will expand with the shaft 12' in response to temperature changes during operation. The inside diameter surface 167 of the air seal ring 164 should preferably be sized to be extremely close to the outside diameter surface 136 of the shaft sleeve 210 on which it seals. By judicious selection of metals and metal combinations, the rate of expansion of the seal elements may be correlated so to diminish any change in the tolerances that could conceivably increase or decrease the gap. A sleeve 210 comprising a metal alloy, for example, steel, bronze, or other metal, or may comprise and appropriate ceramic or carbon graphite material. Use of the same or other appropriate corresponding materials should also be used in the manufacture of the rings 152, 164.

The elements providing for process air sealing may be mounted to the carrier 142 via means of a retainer (not shown), or may be installed as separate components captured between the carrier and a counterbore inner diameter surface 134 forming the cavity 132 in the housing 111. Air seal rings 164 are shown to include a number of grooves 169 which are concentric and do not take the shape of a spiral, as do the similar grooves in the oil seal ring 152. The grooves 169 are defined by the inner diameter surfaces 167, which are the closest that the ring 164 comes into contact with the shaft or sleeve surface. Any air trying to leak out of the compression chamber 18 (FIG. 1) will thus encounter several annular "chambers" formed between the ring 164 and the sleeve surface, which will slow down any leakage due to the labyrinth. As a secondary phenomenon, the labyrinth grooves 169 will also cause more turbulence and will increase the boundary layer depth between surfaces, for example 136 and 167, thereby reducing the possible leakage paths.

The compression principles applying to operation of rotary screw compressors 10 (FIG. 1) and blowers are well-known. The function of the seal cartridges 30L, 30R, as stated above, is both to minimize the leakage of air or gas from the pumping or compression chamber 18 and to prevent the ingress of lubricating oil from following a leakage path along the shaft surface and leaking to the compression chamber 18. Typically, the process pressure applied to the seals on the discharge side of the pump is substantially higher than that applied to the seals on the inlet side. Indeed, at times, inlet side seal modules may be subjected to process pressure below atmospheric pressure, for example, when operating under "no-load" conditions.

Process gas pressure is applied to the process side of each air seal module 60, 160, and specifically will exert an axial force on radially extending surfaces of the air rings 64, 64', 164 that are exposed to the process gas pressure. The air ring then provides a sealing barrier against the escape of process gas from chamber 18 in two ways. Process gas pressure applied to the radially extending surfaces of an air ring 64, 64' urges its sealing face into greater contact with a mating planar surface of the carrier 42. As shown in FIG. 2, the process pressure on a substantial portion of the back surface of the flange 63 is cancelled out by the same pressure exerted on the front surface so the pressure will be applied mostly on the end surfaces 67, 67' of the rings 64, 64' which do not have countervailing pressures from the seal interface side. The ultimate effect is for the process gas pressure to urge the seal rings 64, 64', 164 toward the static sealed interface with the carrier 42, the head member 66 or the radially extending surface of the carrier 142 (FIG. 3), respectively. Simultaneously, wave springs 68 provide a load on the air rings 64, 64' by biasing the flanges 63, 63' toward the respective seal interface to inhibit rotation of the air seal rings. In the absence of process gas pressure, or in the event of a negative pressure, the wave springs 68, 168 will urge the air rings 64, 64', 164 into contact with the radially extending surface of carrier 42, head member 66 or carrier 142 against which they are sealed, thereby tending to maintain a seal. The radially extending surfaces of the air rings 64, 64' are lapped smooth as a mechanical seal face to ensure that no gap exists through which gas could leak. In certain configurations (not shown in FIG. 2), the lapped surface may be replaced by an O-ring gland or groove which contains an O-ring that is compressed against the mating surface of the carrier 42. For example, as shown in FIG. 3A, flange 164 includes an annular cutout for receiving an O-ring 149 which reinforces the static seal and also assists in inhibiting rotation of the air seal ring 164

The second method of providing a bias to maintain the seal comprises a wave spring, for example, wave springs 68, 168 for biasing the oil seal rings 52, 152. In the inventive seal embodiment of FIG. 3A, the wave spring 168 urges oil seal ring 152 into contact with a mating planar surface of the carrier 142. The O-ring 209 is captured between the two components so that it is compressed by a specific amount to prevent oil flow between the radially extending surfaces of the flange 157 and carrier 142, while still allowing the oil seal ring 152 to float radially and locate itself concentrically with the shaft 12' during rotation. The axial load applied by the wave spring 168 also prevents rotation of the seal rings 152 with the shaft 12', keeping them fixed stationary relative to the housing/carrier 142, 111. The wave spring 168 provides static loading to maintain contact between the secondary sealing surface of the oil/air rings and the internal sealing surfaces of the carrier/housing, while allowing the air/oil rings to self-adjust themselves along a radial plane to achieve concentricity with the shaft 12'.

It should be understood that a typical compressor 10 or blower will utilize four complete seal module assemblies. Of these, two seal modules will include spiral grooves machined in a clockwise direction, as shown in FIG. 3B, and the other two will have the spiral grooves machined in the counter-clockwise direction, corresponding to the opposite direction of rotation of the two rotors and the requirement for pumping any oil and air against leakage from the bearing chambers. As with the air ring, the oil ring has the freedom to float radially and self-adjust itself to be concentric to the shaft. The oil ring element is constructed of steel, bronze, or other metallic material.

The oil side of the seal is exposed to the bearings, gears, and other oil wetted components of the pump necessary for journaling the rotors and maintaining proper timing between them. These elements may be "splash" lubricated, or more often, lubricated by an integral pressurized oiling system which directs oil to the bearings. The oil seal rings 52, 152 are wetted on one side by the lubricating oil, and are exposed to the common cavity on the other side. The seals serve to prevent the leakage of oil from the bearing chamber 126 into the common throughhole 145, from where it could possibly enter the process gas or leak to environment through the apertures 45, 145 and channels 19, 119

The seal is effectively generated in two ways, one comprising a static and the other a non-contacting relatively rotational seal. The wave spring 168 urges the oil seal ring 152 into contact with a mating planar surface of the carrier 142. There, an O-ring captured between the two components is compressed by a specific amount to prevent oil flow between them while still allowing the oil seal ring 152 to float radially and self align so as to locate itself concentrically with the shaft 12'. The oil seal ring 152 also is machined along an inner diameter with a directional, spiral groove of specific geometry along its inside diameter. The profile appearance of this groove 159 is similar to a square screw thread.

The minor diameter surface 167 of the spiral groove thread is carefully controlled to be only very slightly larger than the outside diameter of the shaft or sleeve that rotates within it, typically having the same clearance to the shaft as the air ring does. The ring has the ability to self-align itself radially once installed over the shaft, and again at startup. The ring aligns itself to be very close to concentric over the shaft, maintaining a small annular clearance between its minor diameter but not making contact with the shaft after initial startup and thermal cycle of the pump. As with the air seal ring 164, the surface finishes of both sleeve 210 or shaft 12' are of carefully controlled roughness to promote the formation of converging boundary layers under circumstances where the oil seal ring 152 is not wet with leakage oil.

The direction of the spiral groove corresponds to the shaft rotation in a way that the groove path leads back toward the oil reservoir when traced in the direction of rotation. When oil reaches the interface between the oil ring element and the rotating shaft during operation, the spiral groove prevents oil leakage by directing oil back toward the "oil side" of the oil seal ring 152. This is accomplished through the combined effects of hydrodynamic oil film formation and centrifugal effects. When positive pressure exists in the common cavity between the air and oil seal rings, as is always the case on the discharge end and typically the case on the inlet side, this pressure further assists in urging oil back toward the oil sump.

The result of the above is containment of process gas within the pumping chamber with only minimal losses vented to atmosphere or ported back to the pump inlet, and complete containment of lubricating oil in the bearing cases/sump. This is accomplished without generating any contact between the stationary and rotating seal members, thereby keeping frictional heating in the seals faces to a minimum.

One significant feature and distinct advantage of the inventive seals is the ability to minimize oil leakage from the non-rotating housing and the corresponding rotating shaft. As a result of the close tolerances of the parts, and especially the parts adjacent or forming the seal, the seal retains the ability to maintain the close tolerances despite the high pressures developed by the compressors and the variable temperature fluctuations caused by the pressure and frictional heat of the elements and fluid motion relative thereto.

Another significant feature and distinct advantage of the inventive cartridge seals 30, 130, is that the cartridge configuration permits the seals to be constrained in an axially compact space. Reducing the axial space required for the seals facilitates the close spacing of the bearings 14 on opposite sides of the compression chamber 18 (FIG. 1). The shorter the distance upon which the bearings 14 support the shafts 12, 12', the more efficiently will the compressor operate, since the shorter shaft support distance will raise the natural vibrational frequency and allow for operational higher shaft rotational speeds, if desired.

The pressure relies on the boundary layer effect to reduce the leakage of air and oil in the gap between the rotating and non-rotating elements. The boundary layer effect is the tendency of a fluid layer in the immediate vicinity of a bounding surface to stay attached to the bounding surface and the successive layers above the boundary layer surface to move with a laminar fluid flow in proportion to the distance of a specified layer from the boundary layer surface. The speed of fluid flow is decreased as a result, because of the tendency for the fluid at that boundary layer to act as a barrier for the fluid flow through the gap. Coupled with the air resistance resulting from the turbulence caused by the high rotational speeds and the continual injection of additional fluid into the gap by the screw threads, even the small gap between the relative rotating parts is reduced to a smaller size.

In this instance, and referring to FIGS. 2A and 3D (not shown to scale), two relatively rotating surfaces, for example, 136, 167 are shown in the general configuration of two concentric cylinders with an annular gap therebetween. The shaft 12' or sleeve 210 has an outer cylindrical surface 136 (FIG. 3D) and the inner diameter of the seal rings 64, 164 have an internal minor diameter cylindrical surface 65, 167 opposed thereto. The gap a between the surfaces is retained in a very close band by the internal pressure of the pressurized process gas acting radially on the seal rings to self-align them relative to the opposed sealing surfaces, as described above. The gap D in FIG. 2A may under proper conditions become so restricted by means of the creation of boundary layer 180 and surface effect layer 182 so as to close off any fluid motion in the air gap D between the boundary layers 180, 182 between the surfaces 36, 65.

In respect of the seal rings having the grooves 169 (FIG. 3D), the boundary layer 180 generated by the turbulent air flow of the screw threads leads to the development of a continuous flow of fluid, usually buffer or process gas, from the chamber 119 toward the oil side with the bearings 114, as shown in FIGS. 3D and 3E by the Arrow A penetrating into the plane of the drawing. The turbulence is of a sufficient magnitude that it extends radially outwardly of the inner diameter surface 167 and into the groove and almost to the surface 169, as described above. The air gap D a may be very small and indeed may not appear at all, since the majority of the space within the groove 169 may be encompassed by the turbulent air flow 84.

Figure 4:
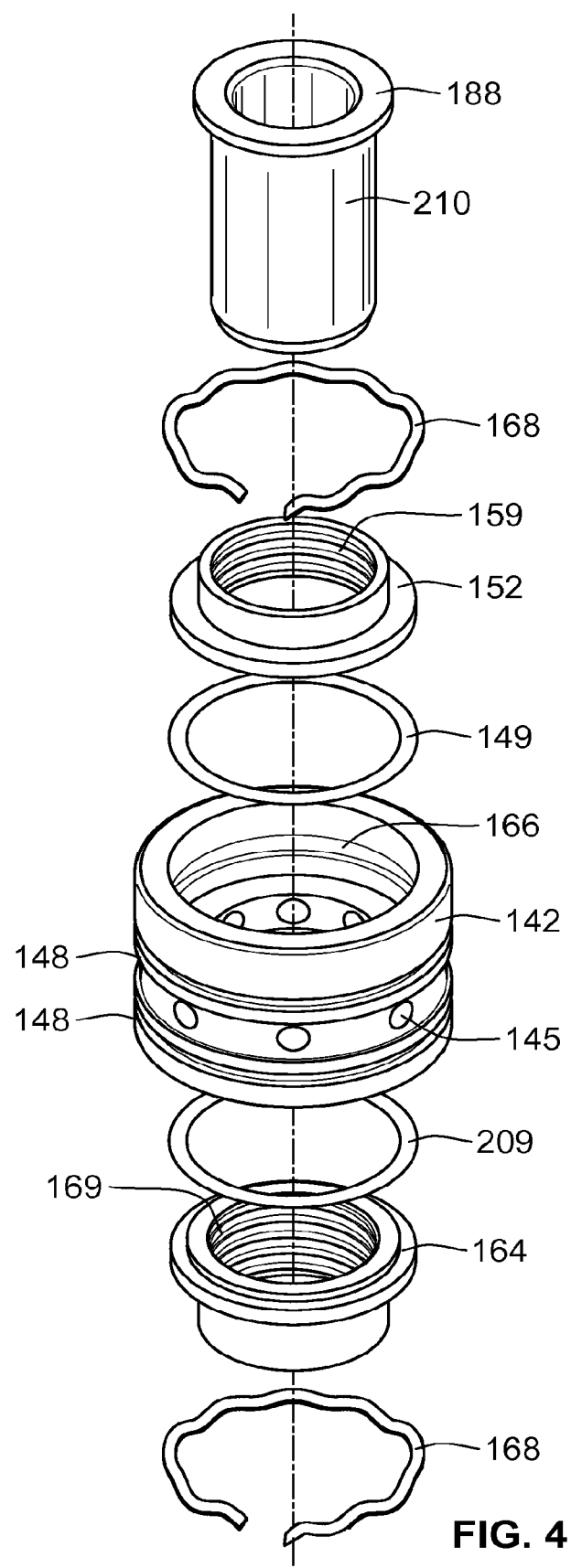
FIG. 4 is an exploded view of the seal cartridge shown in FIG. 3A.

Referring now to FIGS. 3A and 4, the assembly procedure of the deal cartridge 130L is described with reference to that embodiment, but which could be applicable to the assembly of the other embodiments. Beginning with the seal rings 152, 164, an O-ring 149, 209 is placed around the sealing annular radially extending surface of each. The seal rings 152, 164 are then inserted into the cavity within the carrier 142, one from either end until the seal rings 152, 164 and O-rings 149, 209, respectively, engage the radially extending surfaces of the carrier 142. Snap wave springs 168 are then fit around the annular cavity between the rings 152, 164 and the inner diameter surface of the carrier 142. These are inserted until they are in contact with the back surfaces of the flanged portions 157, 163, and are permitted to snap into place within the annular grooves 166, 156, respectively, in the inner diameter of the carrier 142. Two O-rings 208 are placed into appropriately spaced grooves in the sleeve inner diameter surface to seal against the shaft 12' and to ensure concentricity of sleeve 210 to shafts 12 or 12'. The sleeve 210 is then inserted into the centrally disposed hole defined by the seal rings 152, 164, until the flange 188 comes into contact with the end of the seal ring. Another two (or more) O-rings 148 are placed in outer diameter surface of the carrier 142 for sealing against the housing 111. This now defines the seal cartridge 130R, which can be fit over a shaft 12' and slid into place in the seal cavity 134 between the shaft 12 or 12' and the housing 111.

The capability of the seal rings to float radially within the seal ring cavity 132 will be described with reference to FIG. 5. FIG. 5 shows the opposite side of the configuration identified as 130L in FIG. 1, and is essentially the same as the embodiment 130R shown in the cross-sectional view of FIG. 3A, except it is a mirror image thereof. Those elements that do not require it will not be described or even identified in FIG. 5, unless necessary for purpose of the following description. It should be mentioned however, that both the top and bottom portions of the seal elements are shown, rather than the normal convention of showing above the centerline CL, since there are differences therebetween. The top and bottom portions are not mirror images of each other because of the shift in the radial position of the elements and also because of the directionality of the spiral grooves 159 of the oil seal ring 152.

Shaft 12' is a longitudinally extending element that has the seal rings 152, 164 disposed around it in the seal cartridge 130R, as shown. As described above, the shaft is supported and centered in its rotation by bearings 14, 114. Nevertheless, even when the bearings are closely spaced, there remains a possibility of some eccentricity in rotation that would make the centerline CL or axis of rotation of the shaft 12' localized at the cartridge seal 130L, shown in FIG. 5 as a dimension e. Movement of the shaft 12', for example, down the dimension e would cause the seal rings 152, 164 to also shift downwardly to follow the surface 136 of the shaft sleeve 210 on which they ride. The downward shift is represented in FIG. 5 by the large gap "e" between the inner diameter of the carrier 142 at the top, and the very small gap in the corresponding position in the bottom of the cartridge seal. The seal rings 152, 164 can readily move up and down as seen in FIG. 5, or oscillate with the eccentric shaft rotation. Now, because the seal rings 152, 164 are "floating" in the radial direction on the O-rings 209, 149, respectively, that are in contact with the radially extending walls on either side of the throughholes 145, the seal rings are free to oscillate also, as shown in the displaced positions of the radially extending seal face juxtaposition. This oscillation may occur all the while maintaining the static seal between the seal rings and the cartridge walls. The gap "e" dimension that may be accommodated by the exacting manufacturing tolerances described above is in the range of from 0.010 to about 0.125 inches (0.25 mm to about 3.18 mm) in eccentric radial motion for either of the gas or oil rings.

Figure 6:
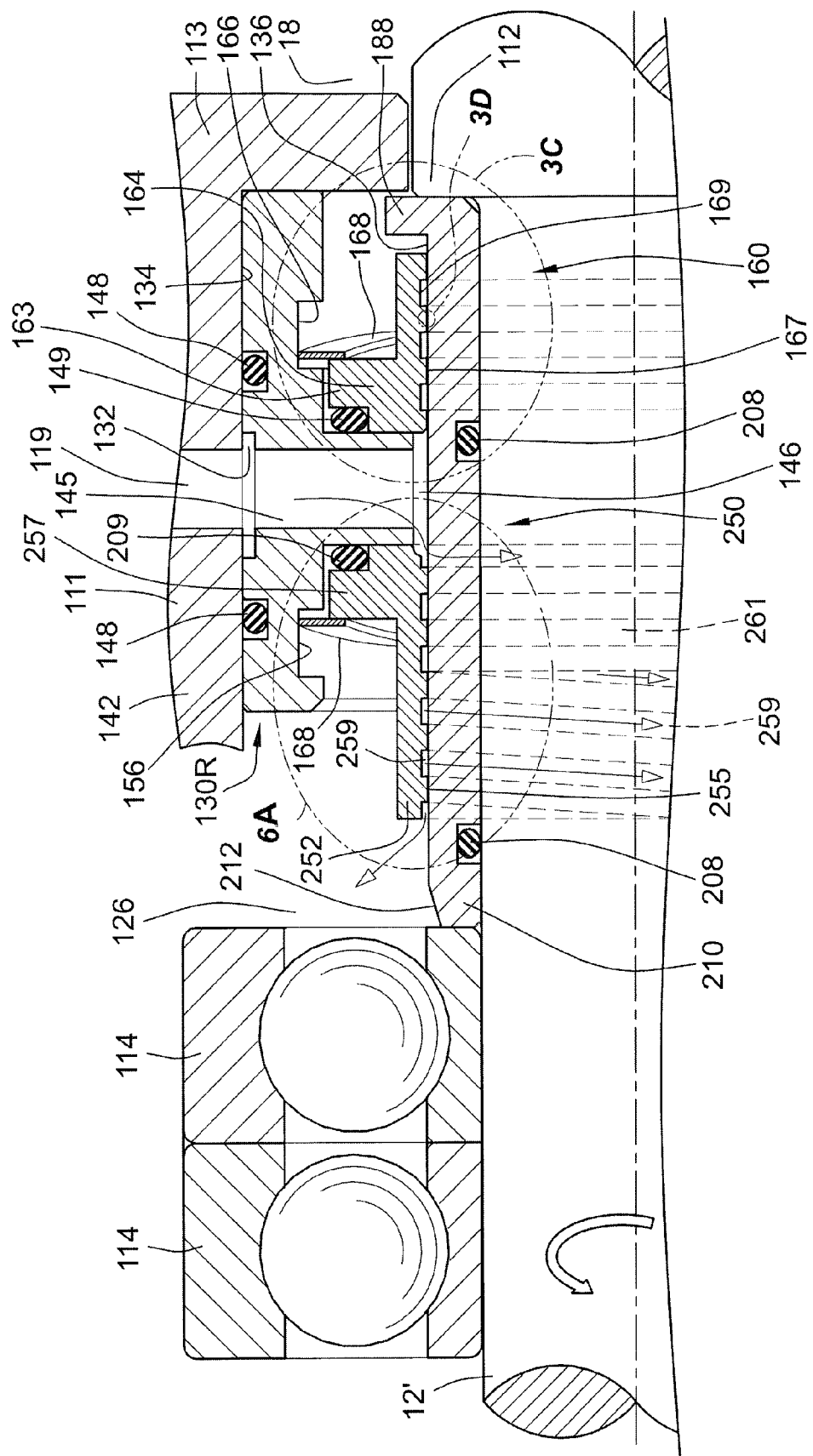
FIG. 6 is a transverse sectional view of a third embodiment of the inventive seal configuration utilizable in the compressor shown in FIG. 1.
Figure 6A:
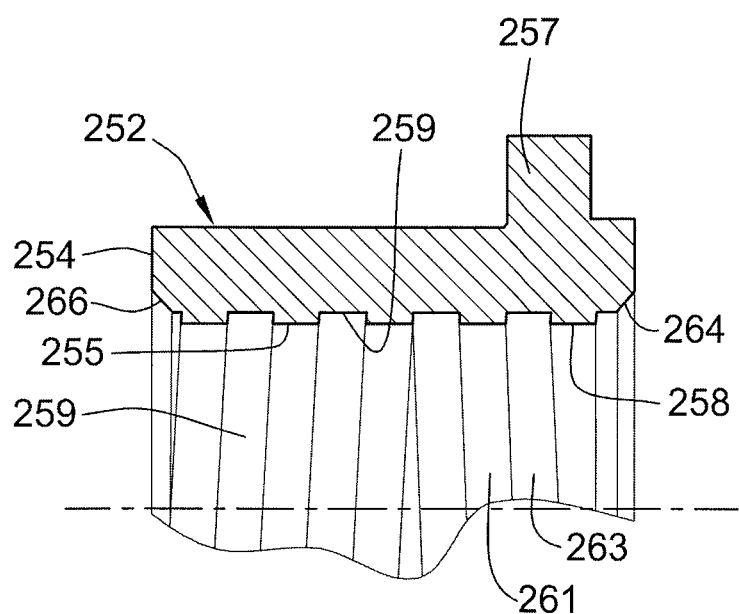
FIG. 6A is a view, on an enlarged scale, of the seal cartridge shown in FIG. 6.

Referring now to FIGS. 6 and 6A, an alternative embodiment of the invention is illustrated. Since almost all elements of the third embodiment of the invention are identical to that of the embodiment shown in FIG. 3A, those elements that are not modified will be designated by the identical numerals as the like elements in FIG. 6. The only element that differs between the two embodiments is the seal ring 250, and the designations of the features in seal ring 250 will all have a different hundred series as the like features in FIG. 3B. For example, while the embodiment of FIGS. 3A and 3B designates the seal ring with the numeral 150, in the embodiment of FIGS. 6 and 6A designates the seal ring with the numeral 250.

In practical applications, use of the seal ring 150 has been very effective in pushing back the oil against the natural flow and back into the bearing chamber 18. In the structure of the seal ring 150, the groove 169 acts as a pump, in that the screw threads of the spiral groove act to pump a significant amount of gas from the fluid communication passage and intermediate chamber 119 and into the oil chamber 126. In normal operation, the air in the oil chamber is then vented out to atmosphere. However, because of the high speed of rotation of the shaft 12, 12', the pumping action often generates too much gas buildup in the oil side, and the vent can be seen to spew out a mist of air laden with oil droplets. Although the oil mist is not harmful to the environment, it is not aesthetically pleasing for such an effluent from a high speed compressor, and thus a modification of the seal ring 250 has been made to provide the benefit of the pumping action of the groove 259, but also avoids the oil misting problem. This accomplished by providing the right most two full grooves 263, as defined by lands 261 to be similar to the grooves 169 of the air compressor seal ring 164.

It will be appreciated upon close inspection, especially of FIG. 6A, that the two grooves 263 are square that is they extend in a plane parallel to the radially extending end surfaces of the ring 250, such as surface 254. That is, the grooves 263 are endless grooves that are circular, circumferential grooves, and not spiral, and meet all around the inner diameter circumference of seal ring 250. Seal rings 250 do not have an inlet groove, such as the first, right most groove 159 of the seal ring 150 in the embodiment of FIG. 3A, that pumps gas into the spiral grooves. Moreover, there is no direct fluid communication between the labyrinth grooves 263 and the spiral groove 259. That is, there is no connection between the grooves 263 and 259 as there is a last barrier land 261 between them groove 259 only begins to veer from the circular form the last land 261 as shown in FIGS. 6 and 6A.

As shown by the arrow which stops at the first barrier land 261, the gas cannot flow into the next groove 263. When the gas reaches a barrier in the first of the two lands 261, which are in the manner of a labyrinth seal as in seal ring 164, these inhibit the gas being injected into the gap a. However, there is just enough gas leaking onto the gap a from the passage 119 that it is injected in much smaller amounts into the spiral groove 259, so as to enable the spiral grooves 259 to pump that gas against the oil attempting to leak along the shaft surface through gap a, as shown by the arrows in roves 259. As the gas supply coming from the fluid communication passage 119 is limited by the labyrinth barrier provided by the first two grooves 263, the pumping action, shown by the arrows provided by the remainder of the inner diameter grooves 259, defined by lands 255, is reduced but remains effective to staunch any oil that my be leaking along the shaft surface.

The invention herein has been described and illustrated with reference to the seal cartridge embodiments 30L and 130R, 130L as shown in FIGS. 2-6A, but it should be understood that the features and operation of the invention as described are susceptible to modification or alteration without departing significantly from the spirit of the invention. For example, the dimensions, size and shape of the various elements may be altered to fit specific applications. Additional elements or substitution of elements may be permitted to reduce moving parts, or to enhance features, such as the ability of the seal rings 159, 259 to float radially within the cavity 132. Other modifications or substitutions may be made once the inventive features are understood, including substituting different types of seals for the types of seals shown in the embodiments of FIGS. 2-6A. Other possible substitutions may be to use a non-contacting radial face seal instead of the two contacting seals shown in FIG. 2, or a combination of a radial and axial seal for the gas compressor side. Accordingly, the specific embodiments illustrated and described herein are for illustrative purposes only and the invention is not limited except by the following claims.

What is claimed is:

1. A seal cartridge for use in a rotary displacement compressor, the compressor having a compressor chamber between two shaft bearings, comprising:
   a) a cartridge carrier disposed in a seal cavity annularly around a shaft, the cartridge carrier being shaped, configured and oriented to house at least two self aligning seal rings, each of the two self aligning seal rings including a biasing element to restrain motion of the respective seal ring in the axial direction but permitting limited freedom of motion of the respective seal ring in the radial direction relative to the cartridge carrier, the cartridge carrier further including a fluid communication path in fluid communication with an environment outside the seal cavity, the shaft having a closely controlled outer diameter surface;
   b) a first oil seal ring being an element of a circumferential shaft seal and being disposed within a cartridge cavity at least partially defined by an inner diameter of said cartridge carrier and sealing between a fluid communication path side and a shaft bearing side, the first oil seal ring being statically sealed against a surface of said cartridge carrier, the first oil seal ring further comprising at least one spiral groove in a machined inner diameter surface thereof, the machined inner diameter surface having very close tolerances, and the at least one spiral groove being shaped, dimensioned, and oriented to provide a dynamic seal between relatively rotating parts by pumping a gas into a gap between the surfaces of the rotating and non-rotating elements of the seal cartridge, the pumping being directed from the fluid communication path side towards the oil bearing side, thereby inhibiting leakage of oil from the bearings along the shaft; and
   c) a second compressed air seal ring for inhibiting leakage of compressed gas disposed within the cartridge cavity and sealing between the fluid communication path side and a compressor side, the second compressed air seal ring having a machined inner diameter surface with very close tolerances and being statically sealed against a surface of said cartridge carrier, and providing a dynamic seal between the seal cartridge and the relatively rotating shaft;
   wherein both the machined inner diameter surfaces of the first oil seal ring and the second compressed air seal ring have very close tolerances so as to provide a seal interface with the closely controlled outer diameter surface of the shaft to maintain the gap between at least one of the surfaces in a tight and essentially constant range, thereby causing the radial self alignment of at least one seal ring relative to the seal cartridge throughout a limited range of radial motion while simultaneously maintaining the respective static and dynamic seals, and wherein said closely controlled outer diameter shaft surface and said inner diameter surface of at least one of said first oil seal ring and said second compressed air seal ring are machined so that the very close tolerances interfacing with said closely controlled outer diameter surface of the shaft maintain the gap between said surfaces in a tight and essentially constant range of from about 0.002 to about 0.004 inches, thereby causing the self alignment of each seal ring, so that there is provided a limited range of radial motion of either of the seal rings, resulting from shaft eccentricity, wherein the limited range is from about 0.010 to about 0.125 inches.

2. The seal cartridge for use in rotary displacement compressor according to claim 1 further comprising a shaft sleeve disposed over the shaft, the shaft sleeve providing an outer diameter surface for the seal interface with the inner diameter surfaces of at least one of the first or second seal rings, the shaft sleeve outer diameter surface providing the closely controlled tolerance in the seal interface with the inner diameter surfaces of the at least one of the first or second seal rings.

3. The seal cartridge for use in rotary displacement compressor according to claim 1 wherein the material comprising at least one of the seal rings has essentially the same rate of thermal expansion within a predetermined temperature range as that of the shaft.

4. The seal cartridge for use in rotary displacement compressor according to claim 2 wherein the material comprising at least one of the seal rings has essentially the same rate of thermal expansion within a predetermined temperature range as that of the shaft sleeve.

5. The seal cartridge for use in rotary displacement compressor according to claim 4 wherein the materials comprising the at least one seal ring and the shaft sleeve are identical.

6. The seal cartridge for use in rotary displacement compressor according to claim 1 wherein the biasing element of each of the two self aligning seal rings further comprises a wave spring, each of the wave springs biasing a respective one of the seal rings in an axial direction while permitting radial repositioning of that seal ring in response to eccentricities in the rotation of the shaft, thereby providing the radial self-aligning capability to the seal rings.

7. The seal cartridge for use in rotary displacement compressor according to claim 2, wherein the surface finishes of the shaft sleeve outer diameter surface and the inside diameter of the compressed air seal ring are precisely finished to a surface condition which promotes the formation of boundary layers of maximum thickness between shaft sleeve outer diameter surface and the inside diameter of the compressed air seal ring to inhibit leakage.

8. The seal cartridge for use in rotary displacement compressor according to claim 7, wherein the surface finishes of the shaft sleeve outer diameter surface is relatively rough so as to create air flow turbulence within the gap between shaft sleeve outer diameter and the seal ring inner diameter surfaces.

9. A seal cartridge for use in a rotary displacement compressor, the compressor having a compressor chamber between two shaft bearings, comprising:

a) a cartridge carrier annularly disposed around a shaft in a seal cavity, the shaft having a closely controlled outer diameter surface, the seal cavity being capable of housing at least two self aligning seal rings in at least two cartridge cavities, each seal ring including a biasing element to restrain motion of the respective seal ring in the axial direction but permitting limited freedom of motion in the radial direction relative to the cartridge carrier, the cartridge carrier includes a fluid communication path in fluid communication with an environment outside the seal cavity, the shaft having a closely controlled outer diameter surface;

b) a first oil seal ring having an outer diameter and being disposed within said at least two cartridge cavities at least partially defined by an inner diameter of said cartridge carrier and sealing between a fluid communication path side and a shaft bearing side, the first oil seal ring being statically sealed against an essentially radial surface of said cartridge carrier, the first oil seal ring further comprising at least one spiral groove in a machined inner diameter surface thereof, the machined inner diameter surface having very close tolerances, and the at least one spiral groove being shaped, dimensioned, and oriented to provide a dynamic seal between relatively rotating parts by pumping a gas from the fluid communication path side towards the oil bearing side, thereby inhibiting leakage of oil from the bearings along the shaft; and c) a second compressed air seal ring having an outer diameter, and inhibiting leakage of compressed gas, disposed within the cartridge cavity and sealing between the fluid communication path side and a compressor side, the second compressed air seal ring having a machined inner diameter surface with very close tolerances and being statically sealed against a radial surface of said cartridge carrier, and providing a dynamic seal between the seal cartridge and the relatively rotating shaft;

wherein both the first oil seal ring and the second compressed air seal ring have outer diameters that are smaller than the inner diameter of said cartridge cavity within which the seal rings are disposed, thereby providing a discrete radial clearance between the inner diameter of said cartridge cavity and each of the outer diameters of the seal rings, permitting the seal rings to be self aligning relative to the seal cartridge throughout a limited range of radial motion while simultaneously maintaining the respective static and dynamic seals, and wherein at least one of the first oil seal ring and the second compressed air seal ring including a machined inner diameter surface having very close tolerances interfacing with the closely controlled outer diameter surface of the shaft to maintain a radial gap between the inner diameter surface and the closely controlled outer diameter surface of the shaft in a tight and essentially constant range, and wherein said closely controlled outer diameter shaft surface and said inner diameter surface of at least one of said first oil seal ring and said second compressed air seal ring are machined so that the very close tolerances interfacing with said closely controlled outer diameter surface of the shaft maintain the gap between said surfaces in a tight and essentially constant range of from about 0.002 to about 0.004 inches, thereby causing the self alignment of each seal ring and providing for a limited range of radial motion of either of the seal rings, resulting from shaft eccentricity, wherein the limited range is from about 0.010 to about 0.125 inches.

10. The seal cartridge for use in rotary displacement compressor according to claim 9, the seal cartridge further comprising a shaft sleeve disposed over the shaft, the shaft sleeve having a closely controlled outer diameter surface for providing a seal interface with at least the inner diameter of the second compressed air seal ring, wherein to create a dynamic seal between the relatively rotating second compressed air seal ring and the shaft sleeve surface by pumping a gas from the fluid communication path side towards the oil bearing side, the spiral groove of said second compressed air seal ring being shaped, dimensioned, and oriented for promotion of the formation of boundary layers of maximum thickness between the second seal ring and the shaft sleeve so as to produce turbulence in the space between the inside diameter of the second air seal ring and the sleeve outer diameter surface, thereby inhibiting leakage of gas and further inhibiting oil from entering the compressor chamber from the bearings along the shaft.

11. The seal cartridge for use in rotary displacement compressor according to claim 10, wherein the surface finishes of the shaft sleeve outer diameter surface and the inside diameter of the compressed air seal ring are precisely finished to a surface condition which promotes the formation of boundary layers of maximum thickness between shaft sleeve outer diameter surface and the inside diameter of the compressed air seal ring to inhibit leakage.

12. The seal cartridge for use in rotary displacement compressor according to claim 11, wherein the surface finishes of the shaft sleeve outer diameter surface is relatively rough so as to create air flow turbulence.

13. The seal cartridge for use in rotary displacement compressor according to claim 9, wherein said spiral groove only extends across a portion of the inner diameter surface of said first oil seal ring, and including at least one labyrinth groove disposed furthest from the oil side which is essentially parallel to the end surface of said first oil seal ring, such that said at least one labyrinth groove is circular and is not in direct fluid communication with said spiral groove.

* * * * *